(12) United States Patent
Hamsici et al.

(10) Patent No.: US 9,530,073 B2
(45) Date of Patent: Dec. 27, 2016

(54) EFFICIENT DESCRIPTOR EXTRACTION OVER MULTIPLE LEVELS OF AN IMAGE SCALE SPACE

(75) Inventors: Onur C. Hamsici, San Diego, CA (US); John H. Hong, San Diego, CA (US); Yuriy Reznik, Seattle, WA (US); Sundeep Vaddadi, San Diego, CA (US); Chong Uk. Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 773 days.

(21) Appl. No.: 13/090,180

(22) Filed: Apr. 19, 2011

(65) Prior Publication Data

US 2011/0255781 A1 Oct. 20, 2011

Related U.S. Application Data

(60) Provisional application No. 61/326,087, filed on Apr. 20, 2010, provisional application No. 61/412,759, filed on Nov. 11, 2010.

(51) Int. Cl.
G06K 9/00 (2006.01)
G06K 9/46 (2006.01)

(52) U.S. Cl.
CPC .................... *G06K 9/4671* (2013.01)

(58) Field of Classification Search
CPC .................................................. G06K 9/4671
(Continued)

(56) References Cited

U.S. PATENT DOCUMENTS 6,678,874 B1 1/2004 Jochym et al.
6,975,755 B1 12/2005 Baumberg
(Continued)

FOREIGN PATENT DOCUMENTS

CN 101390108 A 3/2009
CN 101536035 A 9/2009
(Continued)

OTHER PUBLICATIONS

CH Park et al. "Iris Feature Extraction and Matching Based on Multiscale and Directional Image Representation", Space Scale Methods in Computer Vision, vol. 2695 of the series Lecture Notes in Computer Science, p. 576-583, Jun. 24, 2003.*
(Continued)

*Primary Examiner* — Gandhi Thirugnanam
(74) *Attorney, Agent, or Firm* — Espartaco Diaz Hidalgo

(57) ABSTRACT

A local feature descriptor for a point in an image is generated over multiple levels of an image scale space. The image is gradually smoothened to obtain a plurality of scale spaces. A point may be identified as the point of interest within a first scale space from the plurality of scale spaces. A plurality of image derivatives is obtained for each of the plurality of scale spaces. A plurality of orientation maps is obtained (from the plurality of image derivatives) for each scale space in the plurality of scale spaces. Each of the plurality of orientation maps is then smoothened (e.g., convolved) to obtain a corresponding plurality of smoothed orientation maps. Therefore, a local feature descriptor for the point may be generated by sparsely sampling a plurality of smoothed orientation maps corresponding to two or more scale spaces from the plurality of scale spaces.

37 Claims, 13 Drawing Sheets

*Exemplary Image Processing Stage –*
*Scale Space & Orientation Map Generation*

(58) Field of Classification Search
USPC .................................................. 382/170, 201
See application file for complete search history.

(56) References Cited

U.S. PATENT DOCUMENTS

| | | | |
|---|---|---|---|
| 7,054,468 B2 | 5/2006 | Yang | |
| 7,194,134 B2 | 3/2007 | Bradshaw | |
| 8,315,465 B1* | 11/2012 | Baluja | G06K 9/00456 |
| | | | 382/156 |
| 8,363,973 B2* | 1/2013 | Liu et al. | 382/266 |
| 8,374,442 B2* | 2/2013 | Yu et al. | 382/224 |
| 8,798,377 B2* | 8/2014 | Sanjuan | G06T 15/04 |
| | | | 382/190 |
| 8,897,572 B2* | 11/2014 | Hamsici et al. | 382/195 |
| 2007/0217676 A1 | 9/2007 | Grauman et al. | |
| 2009/0041340 A1* | 2/2009 | Suzuki et al. | 382/159 |
| 2009/0238460 A1* | 9/2009 | Funayama et al. | 382/181 |
| 2010/0027895 A1 | 2/2010 | Noguchi et al. | |
| 2010/0080469 A1* | 4/2010 | Liu et al. | 382/201 |
| 2010/0303358 A1* | 12/2010 | Acharyya | 382/190 |
| 2011/0026837 A1* | 2/2011 | Kita | 382/209 |
| 2011/0194772 A1* | 8/2011 | SanJuan et al. | 382/190 |
| 2011/0218997 A1* | 9/2011 | Boiman et al. | 707/737 |
| 2011/0222779 A1* | 9/2011 | Karanam et al. | 382/199 |
| 2011/0255781 A1* | 10/2011 | Hamsici et al. | 382/170 |
| 2011/0299770 A1* | 12/2011 | Vaddadi et al. | 382/165 |
| 2011/0299782 A1* | 12/2011 | Hamsici et al. | 382/195 |
| 2012/0014578 A1* | 1/2012 | Karssemeijer | G06T 7/0012 |
| | | | 382/131 |
| 2012/0039539 A1* | 2/2012 | Boiman et al. | 382/195 |
| 2013/0135301 A1* | 5/2013 | Marimon Sanjuan et al. | 345/420 |

FOREIGN PATENT DOCUMENTS

| | | |
|---|---|---|
| EP | 0571999 B1 | 3/2000 |
| EP | 2138978 A2 | 12/2009 |
| JP | 2010086540 A | 4/2010 |

OTHER PUBLICATIONS

Alexander C. Berg and Jitendra Malik. "Geometric Blur for Template Matching," in IEEE Computer Society Conference on Computer Vision and Pattern Recognition (CVPR '0I), vol. 1. Dec. 8-14, 2001. Kauai, Hawaii, USA.

Bradley Efron, et al., "Lease Angle Regression," in The Annals of Statistics, vol. 32, No. 2, Apr. 2004, pp. 407-451. Institute of Mathematical Statistics.

Chennubhotla C., et al., "Sparse PCA extracting multi-scale structure from data", Proceedings of the Eight IEEE International Conference on Computer Vision. (ICCV). Vancouver, British Columbia, Canada, Jul. 7-14, 2001; [International Conference on Computer Vision], Los Alamitos, CA : IEEE Comp. Soc, US, vol. 1, Jul. 7, 2001(Jul. 7, 2001), pp. 641-647, XP010554042, DOI: DOI:10.1109/ICCV.2001.937579 ISBN: 978-0-7695-1143-6 sect.2. D G Lowe,"Distinctive image features from scale-invariant key points," International Journal of computer vision, vol. 60, pp. 91-110, 2004.

David G. Lowe. "Abstract: Distinctive Image Features from Scale-Invariant Keypoints," in Computer Science Department, University of British Columbia. Jan. 5, 2004. Vancouver, B.C., Canad, pp. 1-28.

David Marimon et al., "DARTs: Efficient scale-space extraction of Daisy keypoints", 2010 IEEE Conference on Computer Vision and Pattern Recognition (CVPR), Jun. 13-18, 2010, Piscataqay, NJ, USA, Jun. 13, 2010 (Jun. 13, 2010), pp. 2416-2423, XP031725765, ISBN: 978-1-4244-6984-0 sect 3 and 4 figure 1.

Duanduan Y., et al., "Performance evaluation of low-dimensional sifts", Image Processing (ICIP), 2010 17th IEEE International Conference on, IEEE, Piscataway, NJ, USA, Sep. 26, 2010, pp. 2729-2732, XP031815403, ISBN: 978-1-4244-7992-4 sect.2.3.

Ella Bingham, et al., "Abstract: Random projection in dimensionality reduction: Applications to image and text data," in Laboratory of Computer and Information Science, Helsinki University of Technology. Helsinki, Finland, 2001, pp. 1-6.

Engin Tola, et al., "A Fast Local Descriptor for Dense Matching," IEEE Conference on Computer Vision and Pattern Recognition (CVPR '08). IEEE Conference on Jun. 23-28, 2008, pp. 1-8. Anchorage, AK, USA.

Gang Hua, et al., "Discriminant embedding for local image descriptors," in Computer Vision, 2007 (ICCV 2007). IEEE 11th International Conference on Oct. 14-21, 2007, pp. 1-8. Rio de Janeiro, Brazil.

Ichimura N., "GPU computing with orientation maps for extracting local invariant features", Computer Vision and pattern recognition workshops (CVPRW), 2010 IEEE Computer society Conference on, IEEE, Piscataway, NJ, USA, Jun. 13, 2010, pp. 1-8, XP031744006, ISBN : 978-1-4244-7029-7 sect. 4 and 5 figure 5.

International Search Report and Written Opinion—PCT/US2011/033316—ISA/EPO—Feb. 24, 2012.

Krystian Mikolajczyk and Cordelia Schmid. "A Performance Evaluation of Local Descriptors," IEEE Transactions on Pattern Analysis and Machine Intelligence, vol. 27, No. 10, Oct. 2005, pp. 1615-1630.

Lanckriet G., et al., "A Direct Formulation for Sparse PCA Using Semidefinite Programming", Advances in Neural Information Processing Systems SIAM Review, 2004, XP002636643, Retrieved from the Internet: URL:http://www.princeton.eduraspremon/sparsesvd.pdf [retrieved on May 10, 2011].

Onur C. Hamsici and Aleix M. Martinez. "Spherical-Homoscedastic Distributions: The Equivalency of Spherical and Normal Distributions in Classification," in Journal of Machine Learning Research 8, 2007, pp. 1583-1623.

Piotr Dollar, et al., "Abstract: Behavior Recognition via Sparse Spatio-Temporal Features," in Department of Computer Science and Engineering, University of California, San Diego. La Jolla, California, USA, Oct. 2005, pp. 1-8.

Robert Tibshirani. "Regression Shrinkage and Selection via the Lasso," in Journal of the Royal Statistical Society. Series B (Methodological), vol. 58, No. 1 (1996), pp. 267-288.

Rodriguez F., et al., "Sparse representations for image classification:Learning discriminative and constructive non-parametric dictionaries", Univ.Minnesota, Minneapolis, MN,Tech. Rep./IMA Preprint, Dec. 2007, Oct. 2007, XP002636642, Retrieved from the Internet: URL:http://citeseerx.ist.psu.edu/viewdoc/download"doi= 10.1.1.154.7161&rep=rep1&type=pdf [retrieved on May 10, 2011] sect.2.1, 2.3,3.2 figure 3.

Simon A.J. Winder, et al., "Learning local image descriptors." Computer Vision and Pattern Recognition (CVPR '07). IEEE Conference on Jun. 17-22, 2007, pp. 1-8. Minneapolis, MN, USA.

Simon A.J. Winder, et al., "Picking the best daisy," Computer Vision and Pattern Recognition (CVPR '09). IEEE Conference on Jun. 20-25, 2009, pp. 178-185. Miami, FL, USA.

Stephen Boyd and Lieven Vandenberghe. "Convex Optimization," Cambridge University Press, 2004. (http:l/books.google.comlbooks"hl=en&lr=&id=mYm0bLd3fcoC&oi=fnd&pg=PRI1&dq=Boyd+Convex+Optimization.&ots=tbbTtFLEIZ&sig=Mqhicb00483Pc3hyULnSKoazNN8#v=onepage&q&f=false).

Szeliski R: "Computer Vision: Algorithms and Applications", Aug. 18, 2009, [Online] Aug. 18, 2009 (Aug. 18, 2009), pp. 1-979, XP002631475, Retrieved from the Internet: URL:http://szeliki.org/Book/drafts/SzeliskiBook_20100903_draft.pdf> p. 240.

Tipping M.E., "Sparse kernel principal component analysis", Advances in Neural Information Processing Systems 13. MIT Press. 2001, XP002636644, Retrieved from the Internet: URL:http://www.miketipping.com/index.php"page=papers [retrieved on May 11, 2011] sect.3.1 and 3.2.

Vijay Chandrasekhar, et al., "CHoG: Compressed Histogram of Gradients, A Low Bit-Rate Feature Descriptor", Computer Vision and Pattern Recognition in IEEE Conference on Computer Vision and Pattern Recognition (CVPR'09). Jun. 20-25, 2009. Miami, Florida, USA.

(56) References Cited

OTHER PUBLICATIONS

Yamazaki M., et al., "Local Image Descriptors Using Supervised Kernel ICA", Jan. 13, 2009, Lecture Notes in Computer Science, Proceedings of the 3rd Pacific Rim Symposium on Advances in Image and Video Technology, Springer Berlin Heidelberg, Berlin, Heidelberg, vol. 5414, pp. 94-105, XP019137307, ISBN: 978-3-540-92956-7 sect.3 and sect1 par.1 and 2.

Yang KE, et al., "PCA-SIFT: A More Distinctive Representation for Local Image Descriptors", Proceedings of the 2004 IEEE Computer Society Conference on Computer Vision and Pattern Recognition (CVPR'04), 2004, pp. II-506-II-513, vol. 2.

Mairal, J., et al., "Learning Multiscale Sparse representations for Image and Video Restoration", Society for Industrial and Applied Mathematics, vol. 7, No. 1, pp. 214-241, Apr. 16, 2008.

Inoue Kouhei et al., "Speed-up of Kernel Based Nonlinear Subspace Method by Sparsification of Basis Vectors", Technical Report of the Institute of Electronics, Information and Communication Engineers, Japan, the Institute of Electronics, Information and Communication Engineers, Oct. 10, 2002, vol. 102, No. 381, pp. 7-12.

\* cited by examiner

FIG. 10A – PRIOR ART

EFFICIENT DESCRIPTOR EXTRACTION OVER MULTIPLE LEVELS OF AN IMAGE SCALE SPACE

CLAIM OF PRIORITY UNDER 35 U.S.C. §119

The present Application for Patent claims priority to U.S. Provisional Applications No. 61/326,087 entitled "Extracting Daisy Descriptor in Scale-Space", filed Apr. 20, 2010, and No. 61/412,759 entitled "Fast Descriptor Extraction in Scale-Space", filed Nov. 11, 2010, both assigned to the assignee hereof and hereby expressly incorporated by reference herein.

BACKGROUND

Field

One feature relates to computer vision, and more particularly, to methods and techniques for improving recognition and retrieval performance, processing, and/or compression of images.

Background

Various applications may benefit from having a machine or processor that is capable of identifying objects in a visual representation (e.g., an image or picture). The field of computer vision attempts to provide techniques and/or algorithms that permit identifying objects or features in an image, where an object or feature may be characterized by descriptors identifying one or more points (e.g., all pixel points, keypoints of interest, etc.). These techniques and/or algorithms are often also applied to face recognition, object detection, image matching, 3-dimensional structure construction, stereo correspondence, and/or motion tracking, among other applications. Generally, object or feature recognition may involve identifying points of interest in an image for the purpose of feature identification, image retrieval, and/or object recognition. Preferably, the points may be selected and/or processed such that they are invariant to image scale changes and/or rotation and provide robust matching across a substantial range of distortions, changes in point of view, and/or noise and changes in illumination. Further, in order to be well suited for tasks such as image retrieval and object recognition, the feature descriptors may preferably be distinctive in the sense that a single feature can be correctly matched with high probability against a large database of features from a plurality of target images.

For instance, local image computations may be performed using a Gaussian Pyramid to locate the points of interest. A number of computer vision algorithms, such as SIFT (scale invariant feature transform), are used to compute such points and then proceed to extract localized features around them as an initial step towards detection of particular objects in a scene or classifying a queried object based on it features.

After one or more points in an image are detected and located, they may be identified or described by using various descriptors. For example, descriptors may represent the visual features of the content in images, such as shape, color, texture, rotation, and/or motion, among other image characteristics. A descriptor may represent a point and the local neighborhood around the point. The goal of descriptor extraction is to obtain robust, noise free representation of the local information around points.

The individual features corresponding to the points and represented by the descriptors are matched to a database of features from known objects. Therefore, a correspondence searching system can be separated into three modules: point detector, feature descriptor, and correspondence locator. In these three logical modules, the descriptor's construction complexity and dimensionality have direct and significant impact on the performance of the feature matching system.

Such feature descriptors are increasingly finding applications in real-time object recognition, augmented reality, 3D reconstruction, panorama stitching, robotic mapping, video tracking, and similar tasks. Depending on the application, transmission and/or storage of feature descriptors (or equivalent) can limit the speed of computation of object detection and/or the size of image databases. In the context of mobile devices (e.g., camera phones, mobile phones, etc.) or distributed camera networks, significant communication and processing resources may be spent in descriptors extraction between nodes. The computationally intensive process of descriptor extraction tends to hinder or complicate its application on resource-limited devices, such as mobile phones.

A variety of descriptors have been proposed with each having different advantages. Scale invariant feature transform (SIFT) opens a square patch aligned with the dominant orientation (of pixel gradients) in the neighborhood of a point and sized proportionally to the scale level of the detected point. The gradient values in this region are summarized in a cell with a plurality of bin orientation histograms in each cell. Daisy descriptors have shown better and faster matching performance than SIFT in dense matching and patch correspondence problems. An important advantage of Daisy descriptors over SIFT descriptor is that in constructing a Daisy descriptor the spatial binning of oriented derivatives is representative of different resolutions. More specifically, the spatial bin size is larger (i.e., more course) for the bins located further away from the point. Using different resolutions makes Daisy descriptors more robust to rotation and scale changes. However, to calculate fast spatial binning Daisy descriptors requires an additional memory for building a scale-space of three scales for each image derivative. Another important limitation of the Daisy descriptor algorithm is the additional memory needed for storage (relative to SIFT). For instance, three (3) scale levels are needed for each of eight (8) oriented derivatives. When using Daisy descriptors, the total additional memory is 24×M×N bytes for an M×N image (i.e., assuming a one byte dynamic range for each smoothed pixel). The memory complexity further increases to 24×M×N×S for a scale-space with S scale levels. This limits the extraction of scale-invariant Daisy descriptors, i.e. Daisy descriptors in scale-space.

Therefore, a method is needed to reduce the amount of memory needed to generate and/or store Daisy descriptors in scale space.

SUMMARY

The following presents a simplified summary of one or more embodiments in order to provide a basic understanding of some embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

A method for generating a local feature descriptor for an image is provided. The image may be gradually smoothed to obtain a plurality of scale spaces. A point within a first scale space is identified from the plurality of scale spaces for the image. A plurality of image derivatives is then obtained for each of the plurality of scale spaces, where each of the plurality of orientation maps is obtained from non-negative values of a corresponding image derivative. A plurality of orientation maps is then obtained for each scale space in the plurality of scale spaces. The plurality of orientation maps for each scale space may include orientation maps for a plurality of different orientations. Each orientation map may resolve to a single corresponding smoothed orientation map. Each of the plurality of orientation maps is smoothed to obtain a corresponding plurality of smoothed orientation maps. The smoothing of an orientation map, within the plurality of smoothed orientation maps, may be proportional to the scale space level of the orientation map. A local feature descriptor for the point is then generated or obtained by sparsely sampling a plurality of smoothed orientation maps corresponding to two or more scale spaces from the plurality of scale spaces. For example, the local feature descriptor may have a kernel pooling configuration defined by spatial pooling of sample points distributed over a center of the point. In some instances, the local feature descriptor may comprise a plurality of histograms built from oriented gradients from the sparse sampling of the plurality of smoothed orientation maps.

In one example, the point may be a sample point from a subset of locations within the plurality of scale spaces. For instance, the subset of locations may be selected based on an expected pattern for an object. In another example, the subset of locations may be selected based on identified keypoints within the image, wherein a keypoint is a point that has been identified as being robust to changes in imaging conditions.

In one example, the two or more scale spaces include the first scale space and one or more additional scale spaces of lower resolution than the first scale space. For instance, sparsely sampling a plurality of smoothed orientation maps may include: (a) sampling a first plurality of points on a first smoothed orientation map, the first plurality of points arranged in a first ring concentric with a location of the point, (b) sampling a second plurality of points on a second smoothed orientation map, the second plurality of points arranged in a second ring concentric with the location of the point, the second smoothed orientation map corresponding to a second scale space of lower resolution than the first scale space, and/or (c) sampling a third plurality of points on a third smoothed orientation map, the third plurality of points arranged in a third ring concentric with the location of the point, the third smoothed orientation map corresponding to a third scale space of lower resolution than the first scale space. In one example, the second ring may have a second radius greater than a first radius for the first ring, and the third ring has a third radius greater than the second radius for the second ring.

According to one aspect, the plurality of orientation maps may be smoothed using the same smoothing coefficient, the first scale space is one of the two or more scale spaces, and a second scale space is selected to achieve a desired smoothing relative to the first scale space.

An image processing device is provided for generating a local feature descriptor for an image. The image processing device may include an input interface/device, a storage device, and/or a processing circuit. The input interface may serve or be adapted to obtain, capture, and/or receive an image. The storage device may serve to store local feature descriptors for one or more images. The processing circuit is coupled to the input interface and the storage device, and may be adapted to perform operations and/or includes one or more circuits to: (a) gradually smoothen the image to obtain a plurality of scale spaces, (b) identify a point within a first scale space from the plurality of scale spaces, (c) obtain a plurality of image derivatives for each of the plurality of scale spaces, (d) obtain a plurality of orientation maps for each scale space in the plurality of scale spaces, where each of the plurality of orientation maps is obtained from non-negative values of a corresponding image derivative, (e) smoothen each of the plurality of orientation maps to obtain a corresponding plurality of smoothed orientation maps, and/or (f) sparsely sample a plurality of smoothed orientation maps corresponding to two or more scale spaces from the plurality of scale spaces to generate a local feature descriptor for the point. The local feature descriptor may have a kernel pooling configuration defined by spatial pooling of sample points distributed over a center on the point.

The two or more scales spaces may include the first scale space and one or more additional scale spaces of lower resolution than the first scale space. The point may be a sample point from a subset of locations within the plurality of scale spaces.

Sparsely sampling a plurality of smoothed orientation maps may includes: (a) sampling a first plurality of points on a first smoothed orientation map, the first plurality of points arranged in a first ring concentric with a location of the point, (b) sampling a second plurality of points on a second smoothed orientation map, the second plurality of points arranged in a second ring concentric with the location of the point, the second smoothed orientation map corresponding to a second scale space of lower resolution than the first scale space, and/or (c) sampling a third plurality of points on a third smoothed orientation map, the third plurality of points arranged in a third ring concentric with the location of the point, the third smoothed orientation map corresponding to a third scale space of lower resolution than the first scale space. The processing device may be further adapted to build a plurality of histograms of oriented gradients from the sparse sampling of the plurality of smoothed orientation maps, wherein the local feature descriptor comprises the plurality of histograms. In one example, the plurality of orientation maps are smoothed using the same smoothing coefficient, the first scale space is one of the two or more scale spaces, and a second scale space is selected to achieve a desired smoothing relative to the first scale space.

BRIEF DESCRIPTION OF THE DRAWINGS

Various features, nature, and advantages may become apparent from the detailed description set forth below when taken in conjunction with the drawings in which like reference characters identify correspondingly throughout.

FIGS. 10A-10B illustrate a comparison of the generation of a typical Daisy descriptor in comparison to a modified Daisy descriptor over scale space.

DETAILED DESCRIPTION

Figure 1:
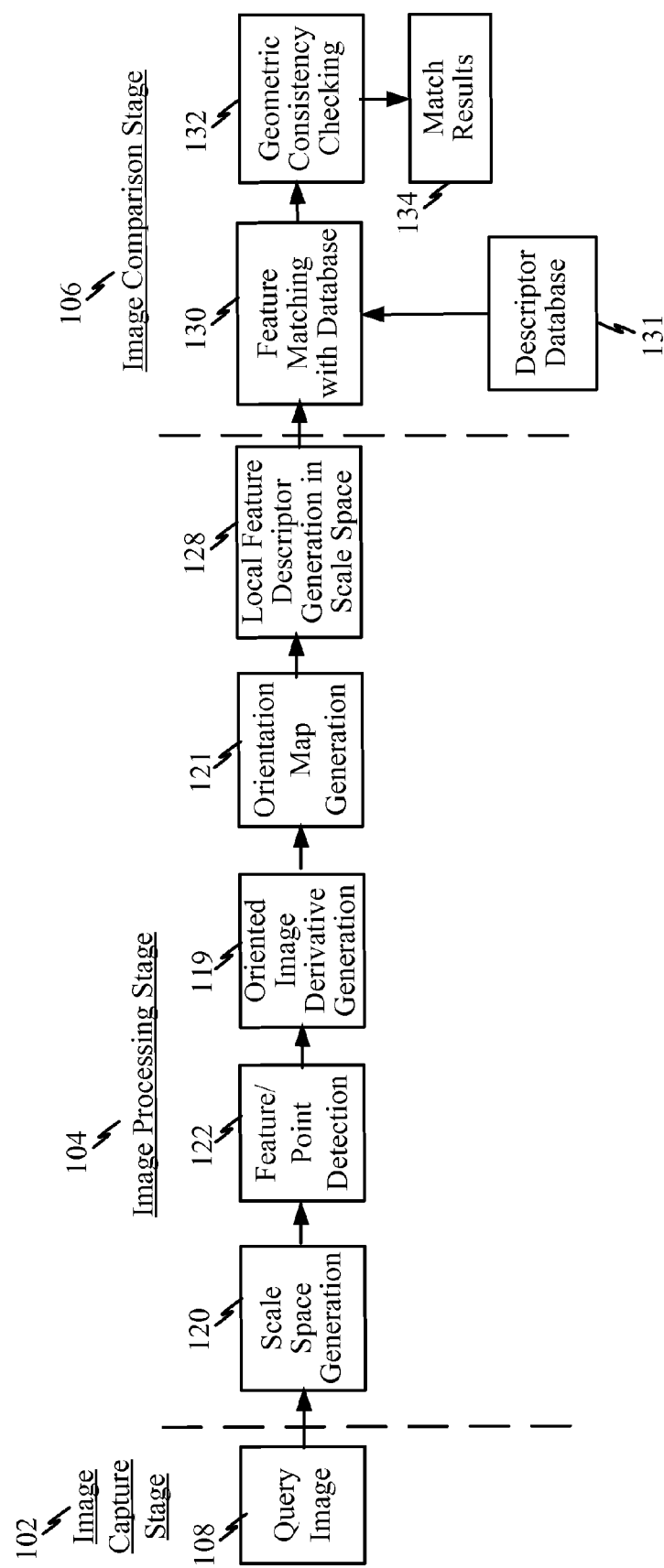
FIG. 1 is a block diagram illustrating the functional stages for performing object recognition on a queried image by using efficiently generated Daisy descriptors.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

Overview

A technique is provided for improving the generation of Daisy descriptors. A modified Daisy descriptor method is provided that reduces the number of smoothed (convolved) orientation maps from three to one, thereby reducing the amount of memory needed to generate a Daisy descriptor. In particular, instead of generating multiple smoothed orientation maps from each orientation map, just one smoothed orientation map is generated for each orientation map (i.e., which includes the non-negative values of a corresponding oriented image derivative) of each scale space level. Then, the smoothed orientation maps for higher scale spaces are used in the generation of the Daisy descriptor. To do this, the higher scales of a scale space pyramid may be specifically selected to approximate the resolutions that would otherwise have been obtained by the multiple smoothed orientation maps per orientation map used in generating original Daisy descriptors.

In yet other implementations, the higher scales of the scale space pyramid may be selected without regard to the resolution that would have been employed by the traditional Daisy descriptor process.

Note that generating the modified Daisy descriptor over multiple levels of the scale space pyramid also makes such modified Daisy descriptor more robust to noise. The original Daisy descriptor algorithm uses a single scale space level to derive finer (current scale) and coarser (higher scale) smoothed orientation maps, thereby relying on a single level of the scale space pyramid. By contrast, the present approach is more stable to noise as the higher scale space levels of the pyramid generate less noisy gradient values. This is because smoothing the image with a larger kernel eliminates the high frequency noise which may be amplified by the derivate operations that generate the orientation maps.

Exemplary Object Recognition Process

FIG. 1 is a block diagram illustrating the functional stages for performing object recognition on a queried image by using efficiently generated Daisy descriptors. At an image capture stage 102, a query image 108 may be captured or otherwise obtained. For example, the query image 108 may be captured by an image capturing device, which may include one or more image sensors and/or an analog-to-digital converter, to obtain a digital captured image. The image sensors (e.g., charge coupled devices (CCD), complementary metal semiconductors (CMOS)) may convert light into electrons. The electrons may form an analog signal that is then converted into digital values by the analog-to-digital converter. In this manner, the image 108 may be captured in a digital format that may define the image I(x, y), for example, as a plurality of pixels with corresponding color, illumination, and/or other characteristics.

In an image processing stage 104, the captured image 108 is then processed by generating a corresponding scale space 120 (e.g., Gaussian scale space), performing feature/point detection 122, obtaining oriented image derivatives 119 for each scale space, performing orientation map generation 121 from the image derivatives, and/or performing local feature descriptor generation in scale space 128 (e.g., modified Daisy descriptors). At an image comparison stage 106, the obtained descriptors 128 are used to perform feature matching 130 with the database of known descriptors 131. The descriptors in the descriptor database 131 may be similarly generated by extracting local feature descriptors in scale space. That is, for a plurality of test images, descriptor may be generated and stored beforehand in the descriptor database 131. Geometric verification or consistency checking 132 may then be performed on point matches (e.g., based on matching descriptors) to ascertain correct feature matches and provide match results 134. In this manner, a query image (or object therein) may be compared to, and/or identified from, a database of target images 109 (or objects).

A number of algorithms, including Scale Invariant Feature Transform (SIFT), have been developed to perform feature detection in images. A first step towards detection of particular objects in an image is classifying the queried object based on its local features. The goal is to identify and select features that are invariant and/or robust to, for example, illumination, image noise, rotation, scaling, and/or small changes in viewpoint. That is, matches between a query image and a comparison target image should be found despite differences in illumination, image noise, rotation, scale, and/or viewpoint between the two images.

Daisy descriptor have shown better and faster matching performance than SIFT descriptors in dense matching and patch correspondence problems. An important advantage of Daisy descriptors over SIFT descriptors is that a Daisy descriptor uses the spatial binning of oriented derivatives at different resolutions. Specifically, in Daisy descriptor generation, the spatial bin size is larger for the bins located further away from the point. This makes Daisy descriptors more robust to rotation and scale changes.

Exemplary Typical Daisy Descriptor Generation

A Daisy descriptor is defined to find the correspondence between two viewpoints of an object. Since every pixel correspondence in two images is desired for a match, an efficient way to achieve this is to define one or more descriptors for the images which can then be compared. Traditional descriptors such as Scale-Invariant Feature Transform (SIFT) and Gradient Location and Orientation Histogram (GLOH) build their descriptors by first taking an oriented derivative of the image and then representing the oriented derivative in a specified spatial region with an orientation histogram. This procedure is computationally demanding because it requires calculating tri-linear interpolations (i.e., two for spatial and one for orientation) for every pixel gradient of the corresponding histogram bins. Daisy descriptors overcome this problem by replacing the linear interpolations with smoothing (e.g., Gaussian smoothing) of the oriented derivatives. Furthermore, the spatial binning layout used to generate a Daisy descriptor (i.e., larger bins moving out from the point over multiple levels of smoothed orientation maps) allows more robustness to scale, location, and orientation changes.

Generally, to generate a typical Daisy descriptor an image is first processed to obtain a scale space. The scale space is processed to obtain corresponding oriented derivatives (i.e., orientation maps). Each oriented derivative is smoothed using a plurality of different smoothing coefficients to obtain a plurality of smoothed (convolved) orientation maps per oriented derivative. The plurality of smoothed orientation maps are then used to generate Daisy descriptors.

Figure 2:
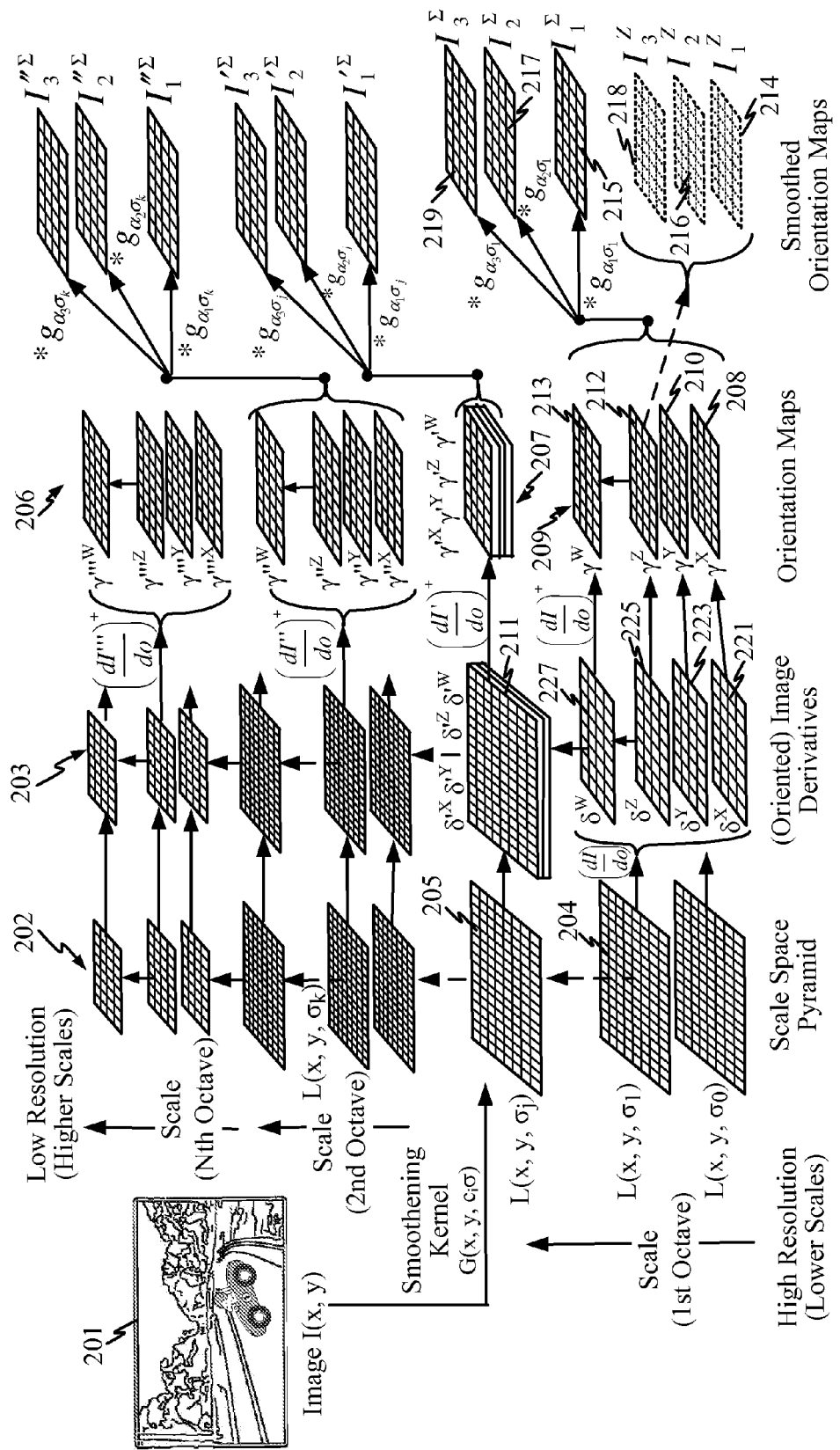
FIG. 2 illustrates the generation of scale spaces and orientation maps used to generate a Daisy descriptor according to one example.

FIG. 2 illustrates the generation of scale spaces and orientation maps used to generate a Daisy descriptor according to one example. First, a digital image $I(x, y)$ 201 may be gradually smoothed/blurred to construct a scale space pyramid 202. The image scale space pyramid 202 is a discrete representation in which a scale space is sampled in both space and scale. Blurring (smoothing) generally involves convolving the original image $I(x, y)$ with a blurring/smoothing function $G(x, y, c_i\sigma)$ (also represented as smoothing function $g_{c_i\sigma}$) at scale $c_i\sigma$ such that the scale space $L(x, y, c_i\sigma)$ is defined as:

$$L(x,y,c_i\sigma)=G(x,y,c_i\sigma)*I(x,y)=g_{c_i\sigma}*I(x,y).\qquad\text{(Equation 1)}$$

In one example, the scale space pyramid 202 may be a Gaussian scale space pyramid. Thus, the smoothing/blurring function $G$ may be a Gaussian kernel, where $c_i\sigma$ denotes the scaling or smoothing coefficient of the Gaussian function $G$ that is used for blurring the image $I(x, y)$. As the multiplier $c_i$ is varied ($c_i$: $c_0 < c_1 < c_2 < c_3 < c_4$), the scaling coefficient $c_i\sigma$ varies and a gradual blurring/smoothing of the image $I(x, y)$ is obtained. Here, a standard deviation $\sigma$ (step size) that is used in obtaining a scaling/smoothing coefficient (e.g., the width of the Gaussian kernel) such that scaling/smoothing coefficients $c_i\sigma$ are represented by $\sigma_i$ (i.e., $\sigma_i = c_i\sigma$).

When the image $I(x, y)$ 201 is incrementally convolved with the smoothing function $G$ to produce the blurred image scale spaces $L$, the blurred image scale spaces $L$ are separated by the constant factor $c$ in the scale space. As the number of blurred (smoothed) image scale spaces $L$ increase and the approximation provided for the scale space pyramid 202 approaches a continuous space, two adjacent scales approach one scale. In one example, the image scale spaces $L$ may be grouped by octaves, where an octave may correspond to a doubling of the value of the standard deviation $\sigma$. Moreover, the values of the multipliers $c_i$ (e.g., $c_0 < c_1 < c_2 < c_3 < c_4$ . . . ), are selected such that a fixed number of image scale spaces $L$ are obtained per octave. The ratio of the scale space and scale may be held constant so that the impulse response is identical in all levels of the pyramid 202. In one example, each octave of scaling may correspond to an explicit image resizing. Thus, as the image $I(x, y)$ 201 is blurred/smoothed by the gradually blurring/smoothening function $G$, the number of pixels is progressively reduced. For a scale space, the scale levels may be exponentially arranged, for example as integer powers of two (2) (e.g., $\sigma_i = 2^i$, for $i = 0, 0.25, 0.5, 0.75, 1, 1.25, 1.5, 1.75, 2, \ldots, 3, \ldots$). In other examples, closer scale spacing may be required, such as square root-of-two or even smaller scaling steps. In another example, the scale space levels of the pyramid may be defined as $2^{s/S}$, where $S$ defines a resolution of each octave and $s$ is the scale level between 1 and $k$ for a positive integer $k$. For instance, in the above example $S=4$ and hence for $k=\{1, 2, 3, 4\}$ the octave 0 scale level standard deviations are $\sigma_i = \{0, 0.25, 0.5, 0.75, 1\}$.

Note that in traditional Daisy descriptor algorithms, no scale space pyramid 202 is actually generated. Instead, the image 201 is merely blurred/smoothed, and the Daisy descriptor is generated from the smoothed version of the image 201. For example, just the smoothed image 204 may be generated without generating the other levels of the scale space pyramid 202.

Second, the oriented derivative $$\left(\frac{\partial I}{\partial o}\right)$$

of each scale level 204 of the scale space 202 is generated to obtain a plurality of corresponding image derivatives 203 (also referred to as "oriented derivatives"). In this example, the plurality of image derivatives 203 may include a plurality of image derivatives. Note that for each scale space 204, a plurality of image derivatives $\delta^X$ 221, $\delta^Y$ 223, $\delta^Z$ 225, and $\delta^W$ 227 are generated corresponding to different orientations (e.g., X, Y, Z, W orientations).

Third, the image derivatives 203 are then processed to obtain corresponding orientation maps 206. In the example illustrated here, the $(\ )^+$ operator is applied to each value of an image derivative to generate a corresponding orientation map. For example, the $(\ )^+$ operator may take any negative value $\delta$ and set it to zero (0) such that $$\delta_{ij}^O = \begin{cases} 0 & \text{if } \delta_{ij}^O \leq 0 \\ \delta_{ij}^O & \text{if } \delta_{ij}^O > 0. \end{cases}$$

Figure 3:
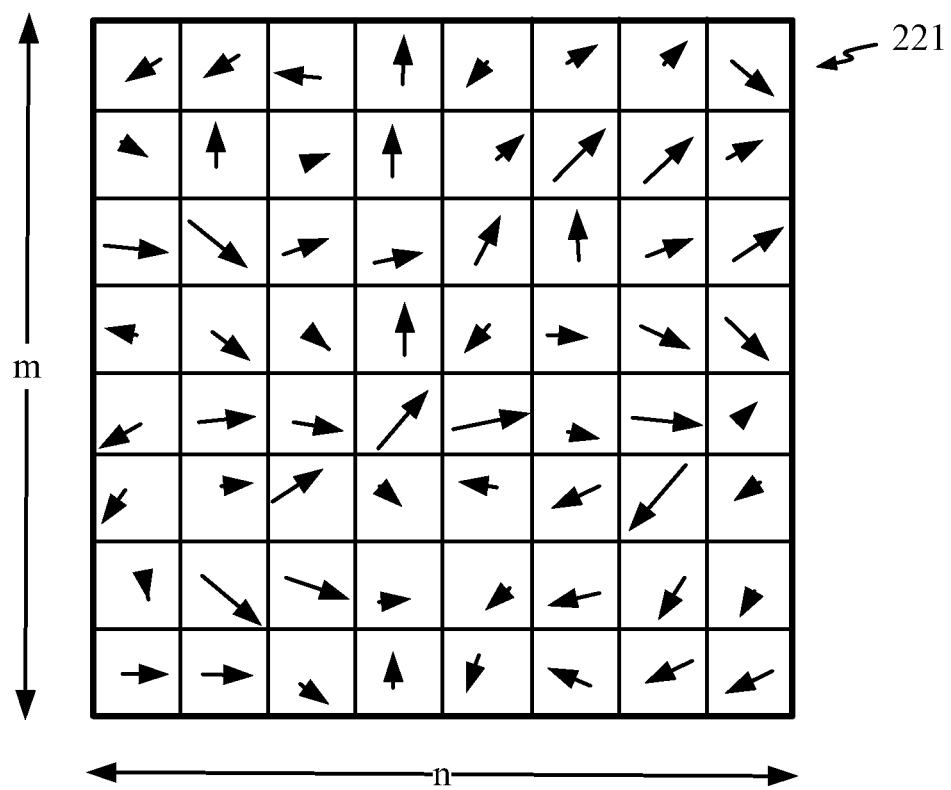
FIG. 3 illustrates how a scale level of the scale space may include pixels having a plurality of gradient orientations to define an orientation map.

For instance, a first image derivative $\delta^X$ 221 has a corresponding orientation map $\gamma^X$ 208, a second image derivative $\delta^Y$ 223 has a corresponding orientation map $\delta^Y$ 210, a third image derivative $\delta^Z$ 225 has a corresponding orientation map $\gamma^Z$ 212, and a fourth image derivative $\delta^W$ 227 has a corresponding orientation map $\gamma^W$ 213. FIG. 3 illustrates how an image derivative 221 of the plurality of image derivatives 203 may include pixels having a plurality of gradient orientations. The orientation maps $$\left(\frac{\partial I}{\partial o}\right)^+$$

include the positive components of the oriented image derivatives $$\left(\frac{\partial I}{\partial o}\right)$$

203 of the image I(x, y) 201 (i.e., a derivative of the smoothed version of the image from the scale space 202), where $(.)^+ = \max(., 0)$ keeps only the positive derivatives along the orientation. The $(.)^+$ operator or function may be a clipping function that sets any negative pixel gradient values of a corresponding image derivative to zero.

Figure 4:
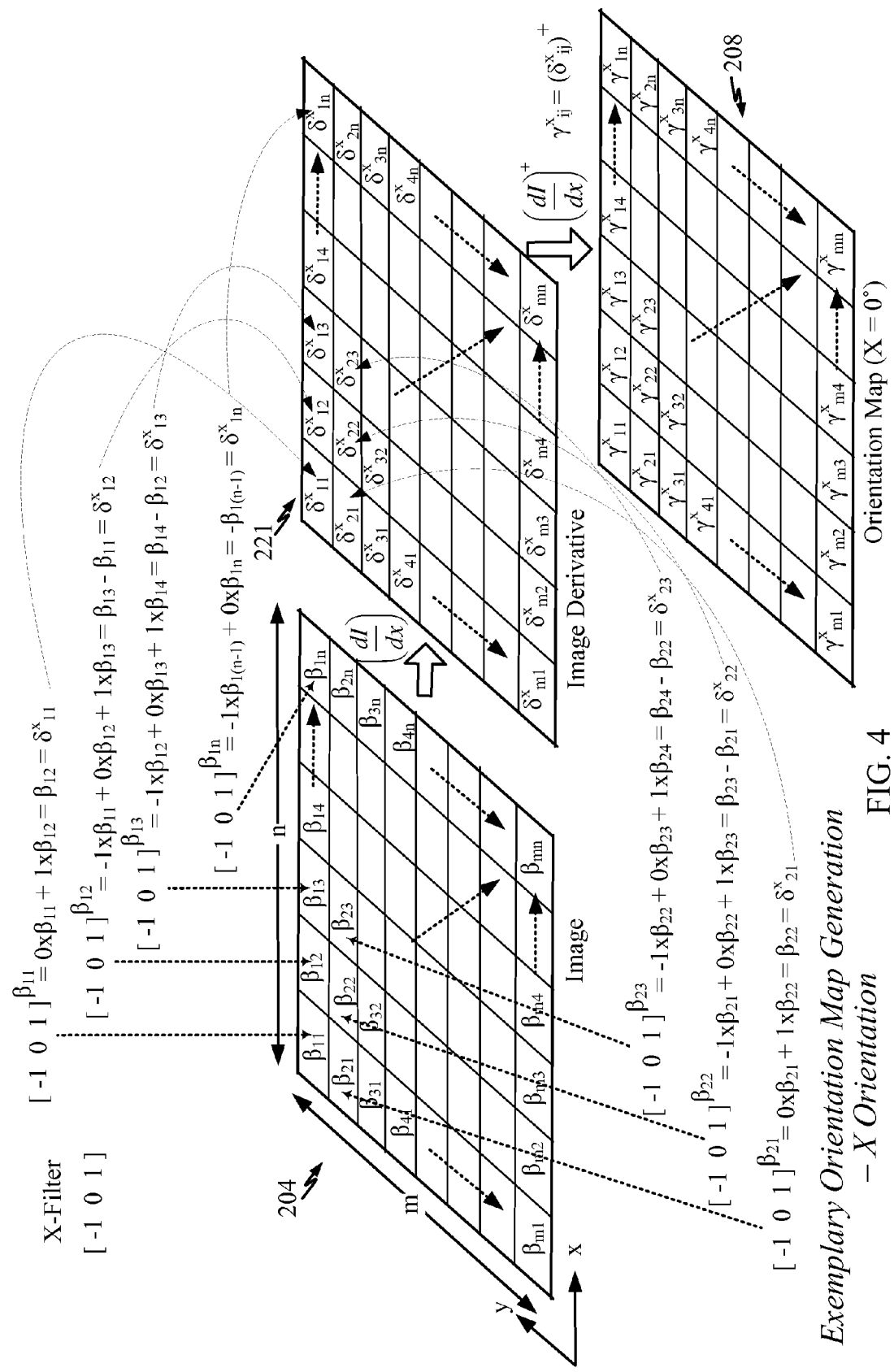
FIGS. 4, 5, and 6 illustrate how orientation maps may be generated from a scale space level.
Figure 5:
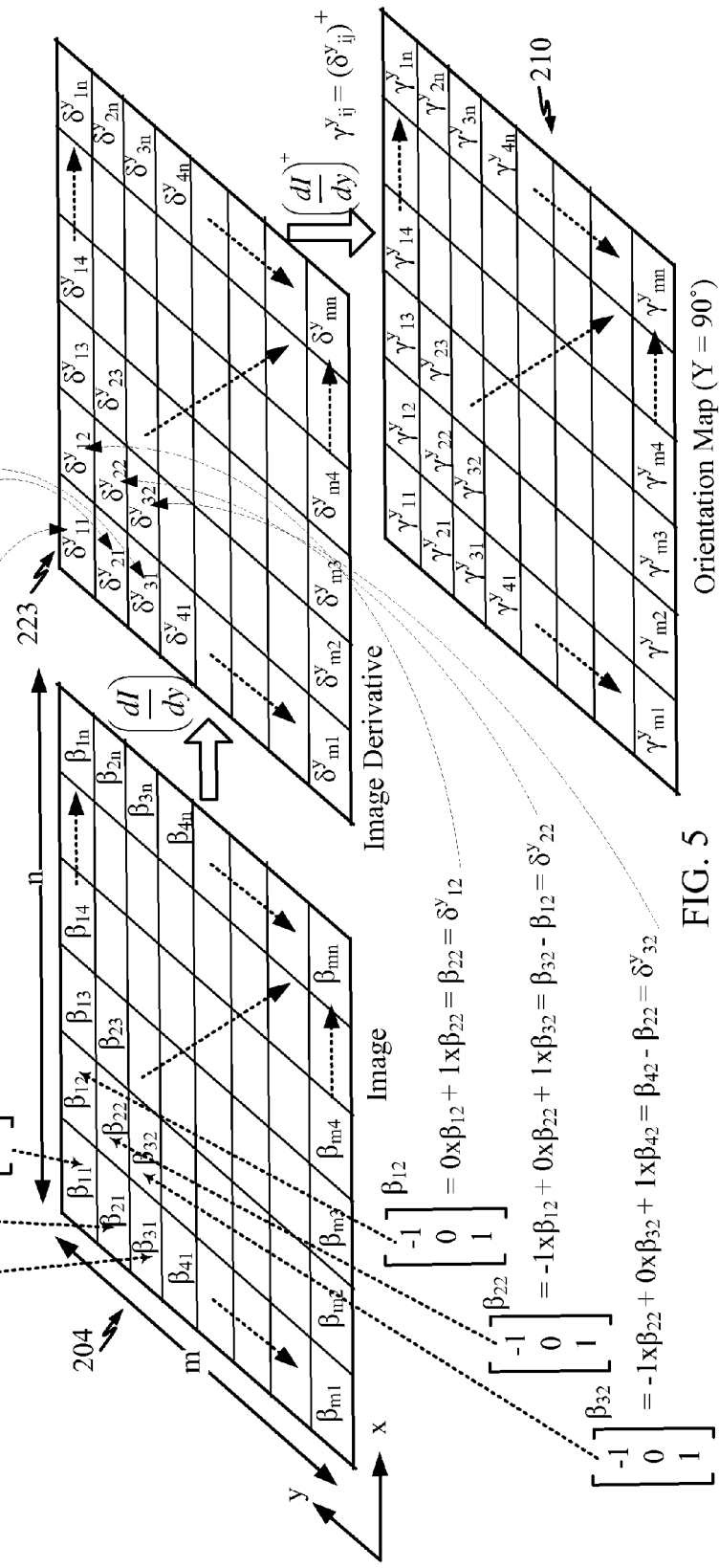
Figure 6:
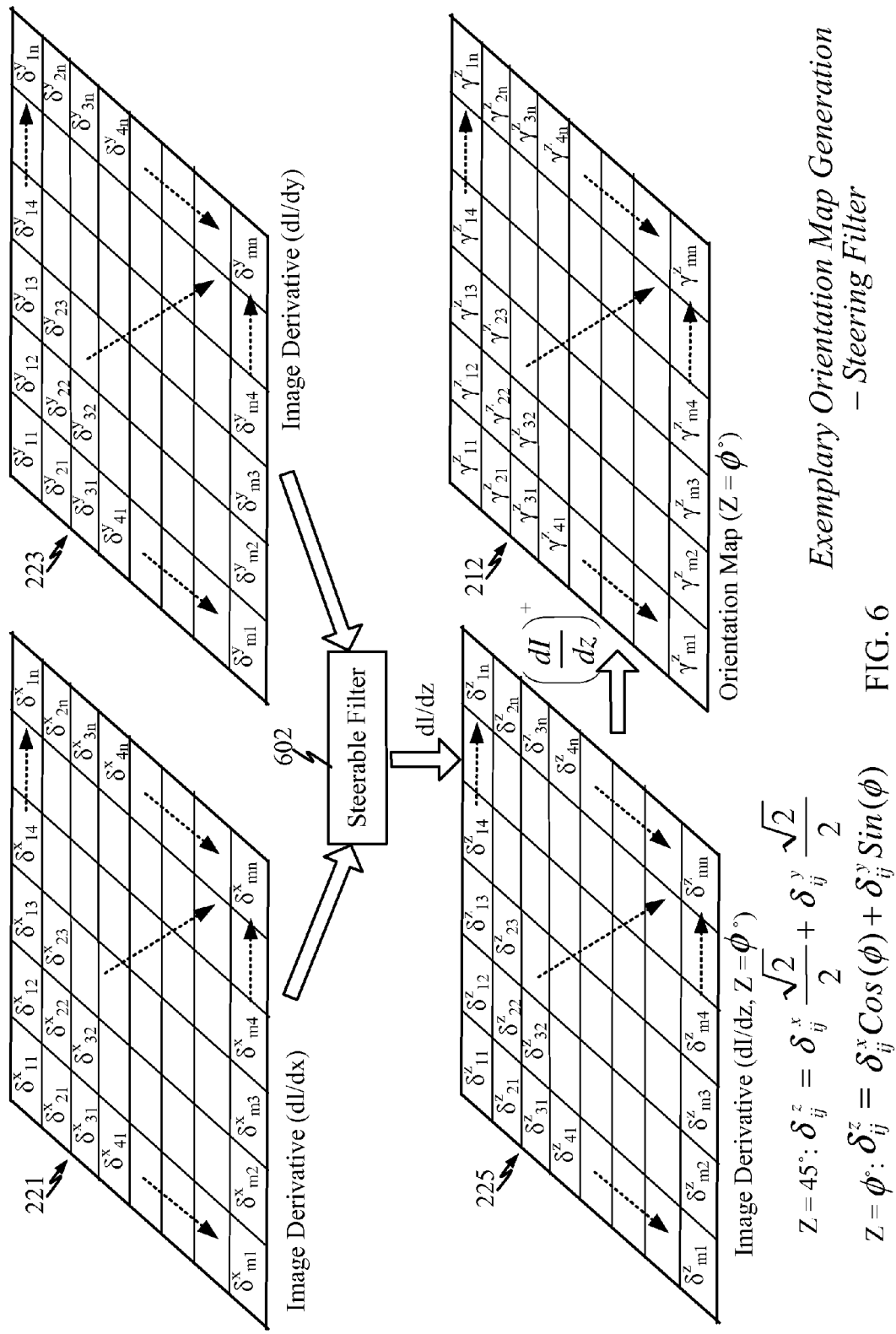

FIGS. 4, 5, and 6 illustrate how orientation maps may be generated from a scale space level. The scale space level 204 may be a smoothened version of the image 201. By taking a plurality of oriented derivatives $$\left(\frac{\partial I}{\partial o}\right)$$

for the scale space level 204, a plurality of images derivatives $\delta^X$ 221, $\delta^Y$ 223, $\delta^Z$ 225, and $\delta^W$ 227 may be obtained. The image space of n pixels by m pixels may be used in this example (e.g., n=m and/or n≠m).

FIG. 4 illustrates the generation of an orientation map along the x-orientation. An x-filter [−1 0 1] is applied along the x-orientation to pixel gradient values $\beta_{ij}$ of a scale space level 204 to generate a corresponding image derivative 221 having a plurality of values $\delta^x_{ij}$. The x-filter is applied along each row of the image scale space level 204 in the x-orientation in a shifting manner and centered on the '0' value of the x-filter [−1 0 1]. For instance, for the pixel gradient value $\beta_{11}$ the x-orientation value $\delta^x_{11}$ is equal to $0 \times \beta_{11} + 1 \times \beta_{12} = \beta_{12}$. Likewise, for pixel gradient value $\beta_{12}$ the x-orientation value $\delta^x_{12}$ is equal to $-1 \times \beta_{11} + 0 \times \beta_{12} + \beta_{13}$. Similarly, for pixel gradient value $\beta_{13}$ the x-orientation value $\delta^x_{13}$ is equal to $-1 \times \beta_{12} + 0 \times \beta_{13} + 1 \times \beta_{14}$. This process is repeated by moving the x-filter across each row of the scale space level 204 to generate the image derivative 221.

The $(\ )^+$ operator is then applied to each value $\delta^x$ of the image derivative 221 to obtain a corresponding orientation map 208 having a plurality of values $\gamma^x$. Note that in computing each orientation map value $\gamma$ using the $(\ )^+$ operator, only the positive derivatives along the orientation are used. For example, in computing an orientation map $$\left(\frac{\partial I}{\partial o}\right)^+,$$

the operator $(.)^+$ means that only the positive pixel gradient values $\delta_{ij}$ (i.e., pixel value derivatives) along a given orientation are used (i.e., the negative values of $\delta_{ij}$ are set to 0). For instance, if $\delta_{12} = -4$ then $\gamma_{12} = 0$. Generally, if a particular pixel gradient value $\delta_{ij} < 0$, then $\delta_{ij} = 0$. Thus, only pixel gradient values $\delta_{ij} > 0$ contribute to the calculation of the orientation values.

FIG. 5 illustrates the generation of an orientation map along the y-orientation. A y-filter $$\begin{bmatrix} -1 \\ 0 \\ 1 \end{bmatrix}$$

is applied along the y-orientation to pixel gradient values $\beta_{ij}$ of a scale space level 204 to generate a corresponding oriented image derivative 223 having a plurality of values $\delta^y_{ij}$. The y-filter is applied along each column of the scale space level 204 in the y-orientation in a shifting manner and centered on the '0' value of the y-filter [−1 0 1]. For instance, for the pixel gradient value $\beta_{11}$ the y-orientation value $\delta^y_{11}$ is equal to $0 \times \beta_{11} + 1 \times \beta_{21} = \beta_{21}$. Likewise, for pixel gradient value $\beta_{21}$ the y-orientation value $\delta^y_{21}$ is equal to $-1 \times \beta_{11} + 0 \times \beta_{21} + 1 \times \beta_{31}$. Similarly, for pixel gradient value $\beta_{31}$ the y-orientation value $\delta^y_{31}$ is equal to $-1 \times \beta_{21} + 0 \times \beta_{31} + 1 \times \beta_{41}$. This process is repeated by moving the y-filter across each column of the scale space level 204 to generate the image derivative 223. The $(\ )^+$ operator is then applied to each value $\delta^y$ of the image derivative 223 to obtain a corresponding orientation map 210 having a plurality of values $\gamma^y$.

In one example, the x orientation may be 0 degrees while the y orientation may be 90 degrees. A plurality of additional image derivatives may be generated for different orientations. For instance, a 180 degree oriented image derivative may be obtained by taking the negative of the 0 degree image derivative. Similarly, a 270 degree oriented image derivative may be obtained by taking the negative of the 90 degree image derivative. In this manner, four orientation maps may be obtained (i.e., 0, 90, 180, and 270 degrees). In yet other implementations, additional orientation maps may be obtained for other orientations, such as 45, 135, 225, and 415 degrees.

FIG. 6 illustrates the generation of an orientation map along a z-orientation. Such z orientation may be, for example, between the x orientation and the y orientation. In some implementations, such z orientation map 212 may be generated by shifting a filter (e.g., [−1 0 1]) in a diagonal direction. However, alternatively, a steerable filter 602 may be used to obtain the z orientation map 212. The steerable filter 602 may linearly combine two other image derivatives (e.g., x orientation image derivative 221 and y orientation image derivative 223) to obtain an image derivative 225 along the z direction. In particular, such linear combination combines corresponding oriented image derivative values $\delta^x$ and $\delta^y$ to obtain a corresponding z-orientation image derivative value $\delta^z$. The specific linear combination of the x-orientation image derivative 221 and y-orientation image derivative 223 may depend on the particular image derivative orientation being sought. For example, if a 45 degree image derivative orientation is sought, then the image derivative values $\delta^x_{ij}$ and $\delta^y_{ij}$ for the x and y orientation image derivatives 221 and 223 may be combined to obtain a corresponding derivative value $\delta^z_{ij}$. In this manner, various multiples of 45 degrees may be obtained. Similarly, other orientation maps (such as multiples of 15 or 30 degrees) may be obtained. In general, for an angle $\phi$, the corresponding image derivative value may be obtained as:

$$\delta^z_{ij} = \delta^x_{ij} \cos(\phi) + \delta^y_{ij} \sin(\phi)$$

As before, the $(\ )^+$ operator is then applied to each value $\delta^z$ of the image derivative 225 to obtain a corresponding orientation map 212 having a plurality of values $\delta^z$.

Consequently, a plurality of orientation maps may be obtained, where the number of orientation maps may be a function of accuracy sought, processing resources available, and/or memory resources available. For example, various implementations may use four (4), eight (8), twelve (12), sixteen (16), twenty (20), twenty-four (24), etc., orientation maps. In some implementations, the angle between the orientation maps may be the same (e.g., 90 degrees, 45 degrees, 30 degrees, 20 degrees, 15 degrees, 10 degrees, etc.).

Referring again to FIG. 2, according to one approach, once a plurality of orientation maps 206 have been generated for each scale space level 204, each orientation map 208, 210, 212, and 213 is smoothed by convolving with a filter (e.g., a Gaussian filter) to obtain a smoothed (convolved) orientation map $I_o^\Sigma$. That is, each smoothed orientation map $I_o^\Sigma$ is calculated by smoothing the orientation maps (i.e., orientation maps 206) of the image 201, such that $$I_o^\Sigma = g_\Sigma * \left(\frac{\partial I}{\partial o}\right)^+, \quad \text{(Equation 2)}$$

where $g_\Sigma$ is the smoothing filter with standard deviation $\Sigma$.

In the example of FIG. 2, a subset of orientation maps 209 are used to generate a plurality of corresponding smoothed orientation maps $I_1^\Sigma$ 215, $I_2^\Sigma$ 217, and $I_3^\Sigma$ 219 for each of the orientation maps. For instance, for a first orientation map 212 associated with the Z orientation, three corresponding smoothed (convolved) orientation maps $I_1^Z$ 214, $I_2^Z$ 216, $I_3^Z$ 218 are generated. Each pixel in the smoothed (convolved) orientation maps 214, 216, and 218 corresponds to a spatial pooling of the oriented derivatives with Gaussian weights. In this example of the Z orientation, three smoothed orientation maps 214, 216, and 218 are generated for each orientation map 212. The convolution operation effectively applies a smoothening coefficient cc, that scales/blurs the values of the orientation map. Note that smoothing function $g_{\alpha_i\alpha_j}$ uses the subscripts $\alpha_i$ and $\sigma_j$ to represent the smoothing/scaling factor applied to the orientation maps. In this example, such smoothing factor may be represented as the product of a first scaling factor $\sigma_j$ (e.g., the scaling factor of the corresponding scale space) and a second scaling factor $\alpha_i$ (e.g., a scaling factor that varies for each level of the smoothed orientation maps). In a similar fashion, smoothed orientation maps may be generated for each corresponding orientation map having different orientations (e.g., orientations X, Y, Z, W, . . . ). For example, a second set of orientation maps 207 (having orientations X, Y, Z, and W), associated with a second scale space level 205 and corresponding image derivatives 211, may be convolved to generate a plurality of corresponding smoothed (convolved) orientation maps $I'_1{}^\Sigma$, $I'_2{}^\Sigma$, and $I'_3{}^\Sigma$.

Figure 7:
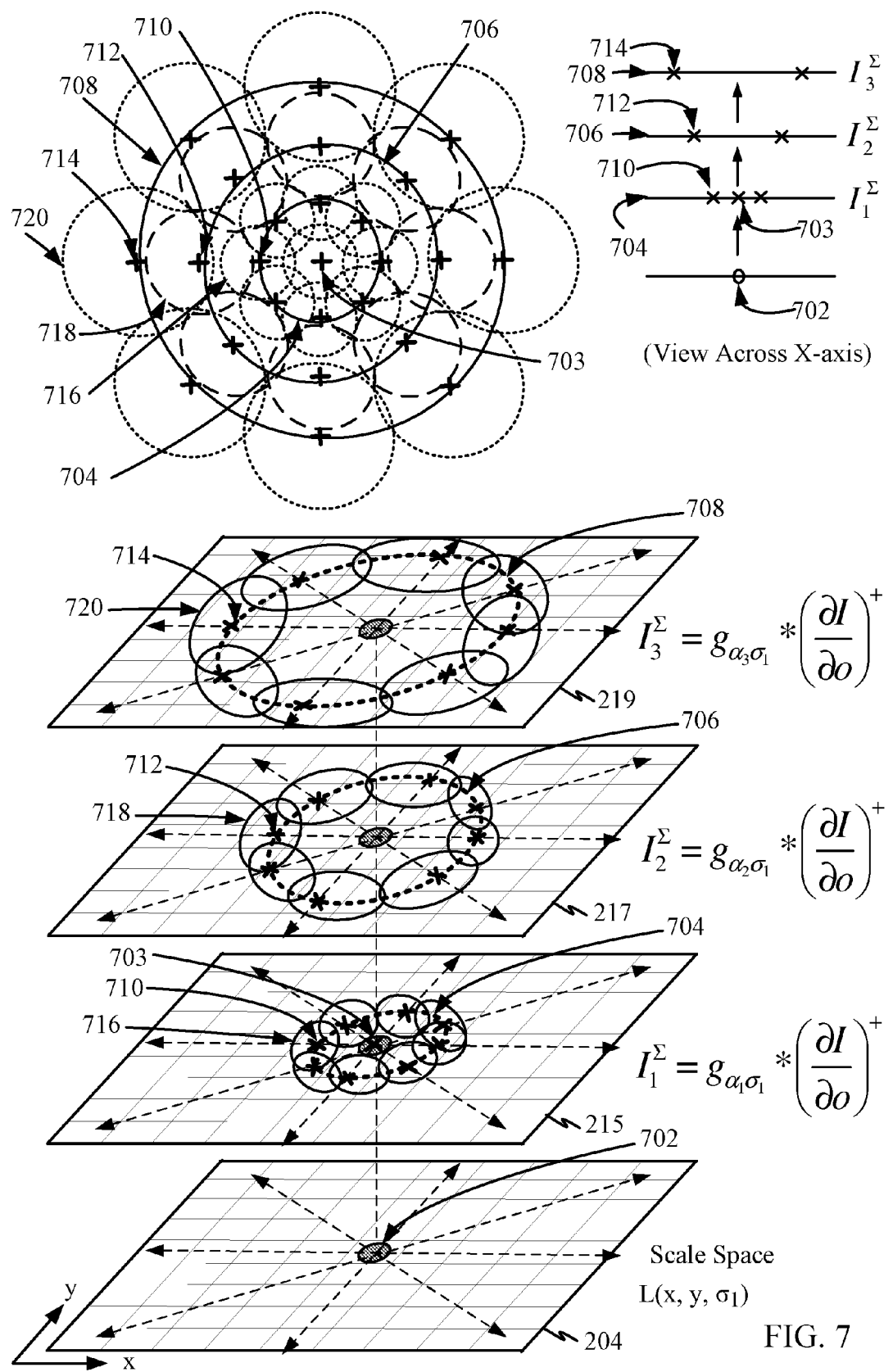
FIG. 7 illustrates the typical generation of a Daisy descriptor.

FIG. 7 illustrates the typical generation of a Daisy descriptor. In this example, the scale space 204 has three corresponding smoothed orientation maps $I_1^\Sigma$ 215, $I_2^\Sigma$ 217, and $I_3^\Sigma$ 219. Each smoothed orientation map $I_1^\Sigma$ 215, $I_2^\Sigma$ 217, and $I_3^\Sigma$ 219 may include a set or plurality of orientation-specific smoothed orientation maps. For instance, a first smoothed orientation map $I_1^\Sigma$ 215 may include the smoothed orientation map $I_1^Z$ 214 for the Z orientation as well as for other orientations, such as smoothed orientation maps $I_1^X$, $I_1^Y$, and $I_1^W$. Similarly, a second smoothed orientation map $I_2^\Sigma$ 217 may include the smoothed orientation map $I_2^Z$ 216 for the Z orientation as well as for other orientations, such as smoothed orientation maps $I_2^W$, $I_2^Y$, and $I_2^W$. Likewise, a third smoothed orientation map $I_3^\Sigma$ 219 may include the smoothed orientation map if 218 for the Z orientation as well as for other orientations, such as smoothed orientation maps $I_2^X$, $I_2^Y$, and $I_2^W$. It should be clear here that the notation for a smoothed orientation map $I_i^\Sigma$ really defines a plurality or set of smoothed orientation maps $I_i^X$, $I_i^Y$, $I_i^Z$ and $I_i^W$ having a plurality of orientations.

For an identified point 702 (e.g., keypoint, sample point, pixel, etc.) in the scale space 204, a Daisy descriptor may be obtained by sparsely sampling the smoothed orientation maps 215, 217, and 219. This may be achieved by a spatial pooling configuration (e.g., Gaussian pooling) distributed over a center of the point 702. In this example, the spatial pooling configuration may be defined as a plurality of concentric rings 704, 706, and 708 on different smoothed orientation maps 215, 217, and 219. The concentric rings 704, 706, and 708 are concentric relative to a sample point 703 corresponding to the identified point 702. Each concentric ring 704, 706, and 708 may include a plurality of sparsely sampled points 710, 712, and 714 along the perimeter of the ring. Each sparsely sampled point 710, 712, and 714 may serve as the center for a cell 716, 718, and 720 (i.e., circle), where the cell size (i.e., radius) increases in size as the sample points move further away from the point 702. In one example, the spatial pooling configuration may include twenty-four (24) points along three (3) concentric rings 704, 706, and 708, with eight (8) sample points (e.g., consequently eight cells) per ring 704, 706, and 708 that are separated by forty-five (45) degrees. The (x) marks correspond to the sampled points or locations around the point (o) 702 to build the Daisy descriptor. This operation is done for each orientation leading to a histogram of oriented gradients (HOG). A Daisy descriptor (e.g., orientation histogram) may then be built by including information about each of the sample points.

In FIG. 7, each circle may represent a region where the radius is proportional to the standard deviations of the smoothing coefficient and the "x" sign represents the sampled point or pixel location at the center of each circle in the smoothed orientation maps. By overlapping the regions of these circles, a smooth transition may be achieved between the regions and a degree of robustness to translation, rotation and scale errors may be obtained.

Having defined a point 702 and corresponding sample points as illustrated by the smoothed orientation maps of FIGS. 2-7, a Daisy descriptor may be built. A histogram $h_\Sigma(u, v)$ for the point 702 located at image coordinates ($u_0$, $v_0$) may be represented as a vector such that:

$$h_\Sigma(u,v)=[I_1^\Sigma(u,v),I_2^\Sigma(u,v),I_3^\Sigma(u,v)]^T \quad \text{(Equation 3)}$$

where $$I_1^\Sigma(u,v)=[I_1^X(u,v),I_1^Y(u,v),I_1^Z(u,v),\ldots,I_1^W(u,v)], \quad \text{(Equation 4A)}$$

$$I_2^\Sigma(u,v)=[I_2^X(u,v),I_2^Y(u,v),I_2^Z(u,v),\ldots,I_2^W(u,v)], \quad \text{(Equation 4B)}$$

$$I_3^\Sigma(u,v)=[I_3^X(u,v),I_3^Y(u,v),I_3^Z(u,v),\ldots,I_3^W(u,v)], \quad \text{(Equation 4C)}$$

for a plurality of orientations. Here $I_1^\Sigma$, $I_2^\Sigma$, and $I_3^\Sigma$ denote the smoothed orientation maps for different gradient directions/orientations. The vector $h_\Sigma(u,v)$ may be normalized to a unit and denoted as $\tilde{h}_\Sigma(u,v)$.

The Daisy descriptor for a point may be defined by a vector made of values from the smoothed orientation maps located on concentric circles centered on the location of the point, and where the amount of smoothing may be proportional to a radii of the circles. Thus, the Daisy descriptor for a point at location (u, v) may be given as $$D(u,v)=$$

$$[\tilde{h}_{\Sigma_1}{}^T(u,v),$$

$$\tilde{h}_{\Sigma_1}{}^T(l_1(u,v,R_1)),\ldots \tilde{h}_{\Sigma_1}{}^T(l_\nu(u,v,R_1)),$$

$$\tilde{h}_{\Sigma_2}{}^T(l_1(u,v,R_2)),\ldots \tilde{h}_{\Sigma_2}{}^T(l_\nu(u,v,R_2)),$$

$$\tilde{h}_{\Sigma_3}{}^T(l_1(u,v,R_3)),\ldots \tilde{h}_{\Sigma_3}{}^T(l_\nu(u,v,R_3))], \quad \text{(Equation 5)}$$

where $l_j(u, v, R_i)$ is the pixel location with distance $R_j$ from the point 702 at location (u, v) in a direction/orientation given by j (e.g., four direction, eight directions, etc.). Here, the subscript "V" represents the number of histograms at a single smoothed orientation map level. For the example in FIG. 7, this is eight (8) histograms per layer. Note that Equations 4A, 4B, 4C, and 5 assume that three (3) smoothed (convolved) orientation map levels are used, but additional numbers of levels may be used in other implementations.

While sparsely sampling the smoothed orientation map as illustrated in FIG. 7 saves computation time in comparison to SIFT, it increases the size of memory needed to store the Daisy descriptor. In particular, the memory complexity becomes worse for the points detected over the scale space pyramid 202. For an M×N image, a total additional memory of 24×M×N is needed for Daisy descriptors in comparison to SIFT descriptors. This is because to calculate the Daisy descriptor, twenty-four (24) additional smoothed (convolved) orientation maps for each scale level of the scale space pyramid 202 are needed (i.e., 3 smoothed orientation map scales times 8 orientations per smoothed orientation map). The memory complexity further increases to 24×M×N×S for a scale-space with S scale levels. Therefore, a way to reduce the size of memory needed to generate the Daisy descriptor would be beneficial.

According to one aspect, the memory complexity for scale-invariant Daisy descriptor extraction can be reduced to 8×M×N×S by using the already build Gaussian scale-space. The parameters of Daisy descriptor are adjusted to extract the Daisy descriptors from multiple scale space levels of a scale space pyramid.

Exemplary Improved Daisy Descriptor Over Scale Space

One way to achieve such reduction in the size of memory needed for generating a Daisy descriptor is to avoid calculating a plurality (e.g., three) of smoothed (convolved) orientation maps for each of the orientation maps 208, 210, 212 and 213. That is, rather than calculating a plurality of smoothed orientation maps $I_1^\Sigma$ 215, $I_2^\Sigma$ 217, and $I_3^\Sigma$ 219 per set of orientation maps 206, one approach selects or adjusts the smoothening kernels for the scale space levels of the scale space pyramid such that they coincide with or approximate the desired smoothed (convolved) orientation map scales.

In the example illustrated in FIGS. 2 and 7, a first smoothed orientation map $I_1^\Sigma$ 215 may be represented by:

$$I_1^\Sigma = g_{\Sigma 1} * \left(\frac{\partial I}{\partial o}\right)^+ = g_{\alpha_1 \sigma_1} * \left(\frac{\partial I}{\partial o}\right)^+. \quad \text{(Equation 6)}$$

Similarly, the second smoothed orientation map $I_2^\Sigma$ 217 may be represented by:

$$I_2^\Sigma = g_{\Sigma 2} * \left(\frac{\partial I}{\partial o}\right)^+ = g_{\alpha_2 \sigma_1} * \left(\frac{\partial I}{\partial o}\right)^+. \quad \text{(Equation 7)}$$

Likewise, the third smoothed orientation map $I_3^\Sigma$ 219 may be represented by:

$$I_3^\Sigma = g_{\Sigma 3} * \left(\frac{\partial I}{\partial o}\right)^+ = g_{\alpha_3 \sigma_1} * \left(\frac{\partial I}{\partial o}\right)^+. \quad \text{(Equation 8)}$$

In Equations 6, 7, and 8, the smoothing filter $g_{\Sigma 1}$ of Equation 1 may represent an overall or resulting smoothing/scaling. In this example, the smoothing filter $g_{\Sigma 1} = g_{\alpha_i \sigma_1}$, meaning the smoothing filter has a standard deviation that may be represented as a product or combination or a first scaling coefficient $\sigma_j$ and a second scaling coefficient $\alpha_{h=1...3}$ (used in generating each of the smoothed orientation maps $I_1^\Sigma$ 215, $I_2^\Sigma$ 217, and $I_3^\Sigma$ 219) such that $$g_{\Sigma h} = g_{\alpha_h \sigma_j} \quad \text{(Equation 9)}$$

However, by properly selecting the scaling coefficients $\sigma_j$ for the scale spaces (of the scale space pyramid), the Daisy descriptor can be calculated using the already calculated scale spaces of the scale space pyramid without the need to calculate a plurality of smoothed orientation maps for each orientation map.

Figure 8:
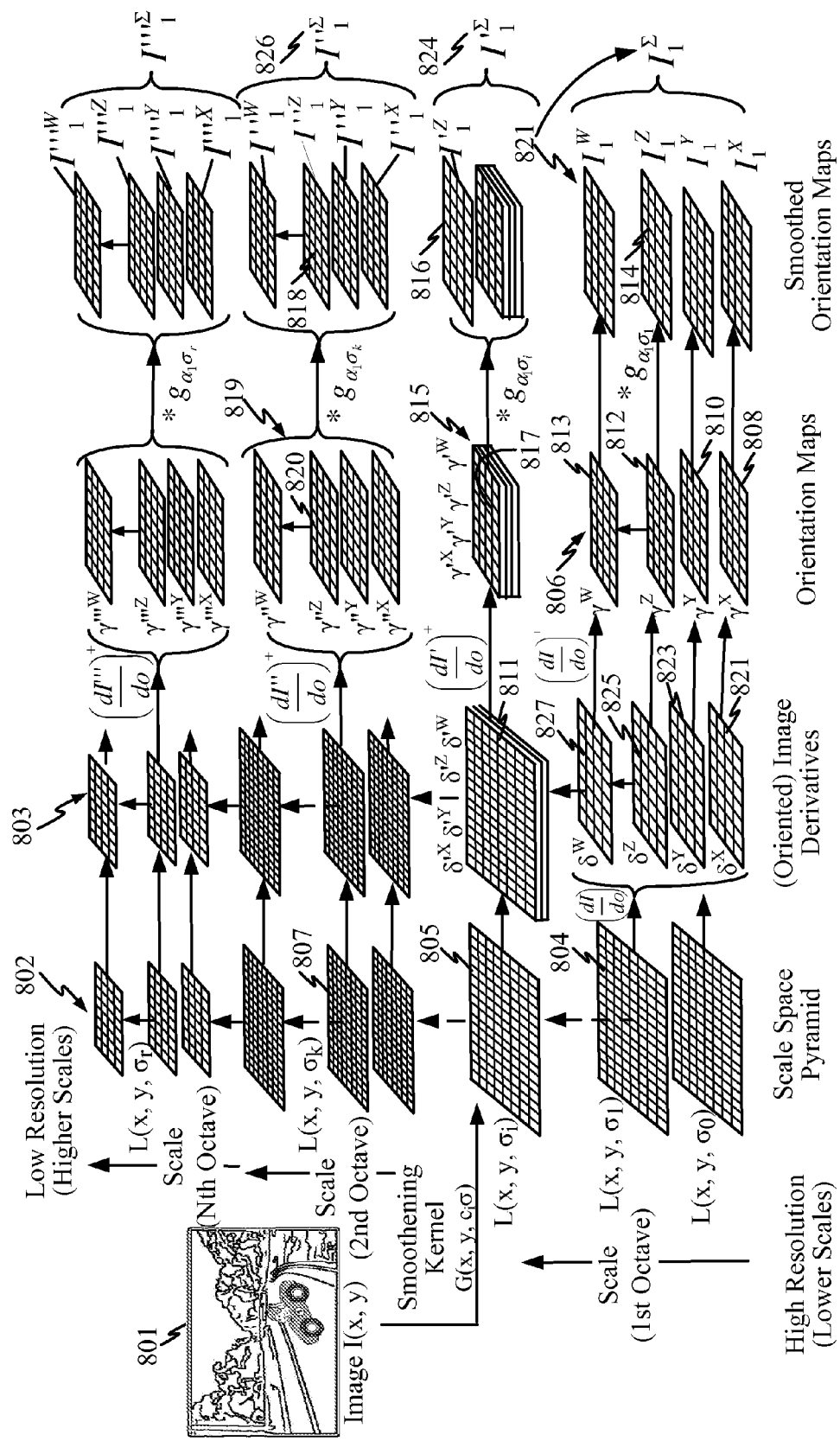
FIG. 8 illustrates the generation of scale spaces and orientation maps used to generate a modified Daisy descriptor according to a more efficient example that avoids the need for generating multiple smoothed (convolved) orientation maps for each orientation map.

FIG. 8 illustrates the generation of scale spaces and orientation maps used to generate a modified Daisy descriptor according to a more efficient example that avoids the need for generating multiple smoothed orientation maps for each orientation map. The image I(x, y) 801 is convolved with a smoothening kernel (at different kernel widths) to obtain a scale space pyramid 802. As in FIG. 2, oriented derivatives of each scale space level 804 of the pyramid 802 are generated to obtain a plurality of image derivatives $\delta^x$ 821, $\delta^y$ 823, $\delta^z$ 825, and $\delta^w$ 827. For each image derivative, a corresponding orientation map is then obtained as in FIG. 2.

It is observed that taking the derivative of an image and smoothing is equivalent to smoothing and then taking the derivative. This property is used to simplify the Daisy descriptor process illustrated in FIGS. 2 and 7 by performing smoothing of the image I(x, y) 801 in such a way that the subsequent smoothed orientation maps can be reduced from three to one per orientation map. Note that, the image derivative is passed through the nonlinear (.)±function to obtain the orientation map. Although the orientation map followed by smoothing (as in a typical Daisy) is not exactly the same as smoothing followed by the orientation map and another smoothing as in modified Daisy descriptors illustrated in FIG. 8, in practice it is seen that both of these approaches generate similar descriptors. Thus, the scaling or smoothing coefficients for scale space levels of the scale space pyramid 802 are specifically selected so that a Daisy descriptor is based on smoothed orientation maps for a plurality of scale space levels.

If the image I(x, y) 801 is a one dimensional image, convolution of the derivative of the image with a scale space kernel $g_o$ is given by $$\frac{\partial I}{\partial o} * g_\sigma = \frac{\partial}{\partial o}[I * g_\sigma]. \quad \text{(Equation 10)}$$

This equality is used to calculate the Daisy descriptor over the scale space pyramid 802. Specifically, instead of generating three (3) smoothed versions of the oriented gradients at each scale level (e.g., smoothed orientation maps $I_1^\Sigma$ 215, $I_2^\Sigma$ 217, and $I_3^\Sigma$ 219 in FIGS. 2 and 7 for each scale space level 204), a base or single smoothed (convolved) orientation map is calculated for each orientation map 808, 810, 812, and 813 corresponding to each scale space level 804 and image derivatives 821, 823, 825, and 827. For example, a plurality of oriented derivative operations (for different gradient orientations) results in a first set of orientation maps 806. The first set of orientation maps 806 may then be smoothed by a convolution operation to obtain a corresponding set of smoothed orientation maps $I_f^\Sigma$ 821. It should be noted that a single smoothed orientation map is obtained for each orientation map. For instance, the orientation map 812 (for the Z orientation) results in one smoothed orientation map $I_f^z$ 814. This process is repeated for all scale space levels of the scale space pyramid 802 such that a single smoothed orientation map is generated for each orientation map.

Rather than generating the second $I_2^\Sigma$ and third $I_3^\Sigma$ smoothed orientation maps 217 and 219 as in FIGS. 2 and 7, the approach of FIG. 8 uses smoothed (convolved) orientation maps corresponding to higher scale spaces of the scale space pyramid 802. The degree or extent of smoothing of a smoothed orientation map is predetermined from the scale space pyramid 802. Thus, a smoothed orientation map at a higher scale of the scale space pyramid 802 can be specifically selected to approximate the second $I_2^\Sigma$ and third $I_3^\Sigma$ smoothed orientation maps 217 and 219 of FIG. 7.

For instance, rather than generating the second and third smoothed orientation maps $I_2^\Sigma$ 217 and $I_3^\Sigma$ 219 in FIG. 7, the higher levels of the scale space pyramid 802 can be selected so that their corresponding smoothed orientation maps can be used instead. In FIG. 8, a second scale space 805 may have a corresponding smoothed orientation map $I'_1^\Sigma$ 824 and a third scale space 807 may have a corresponding smoothed orientation map $I''_1^\Sigma$ 826. For the Z orientation for example, the resulting smoothing of the first smoothed orientation map $I_1^Z$ 814 may be equal to the smoothing of the first orientation map $I_1^Z$ 214. Here, the terms "resulting smoothing" and/or "overall smoothing" may refer to the amount of scaling/blurring of a smoothed orientation map. The resulting smoothing of the second smoothed orientation map $I'_1^Z$ 816 may be approximately equal to the resulting smoothing of the second smoothed orientation map $I_2^Z$ 216 (FIG. 2) while the resulting smoothing of the third smoothed orientation map $I'_1^Z$ 818 may be approximately equal to the resulting smoothing of the third smoothed orientation map $I_3^Z$ 218 (FIG. 2). Thus, in the modified Daisy descriptor over scale space of FIG. 8, since the primary smoothing coefficients σ (for the scale space pyramid) and/or the secondary smoothing coefficients α (used to generate the smoothed orientation maps) are known, particular higher scale spaces (of the scale space pyramid 802) may be selected from which to obtain the second and third smoothed orientation maps to provide approximately equivalent overall smoothing as those of FIG. 2. For instance, the secondary smoothing coefficient cc may be a constant ($\alpha=\alpha_1$) for all levels of the scale space. Therefore, the scaling/smoothing achieved is proportional to the scaling space level. Making the smoothing kernel standard deviation $\alpha_1\sigma_i$ proportional to the scale space level helps achieve scale invariance.

From FIG. 8, it can be appreciated that a first scale space 804 is generated using a first smoothing/scaling coefficient $\sigma_1$. As in FIG. 2, a plurality of image derivatives 803 are generated, where each scale space level 804 may have a plurality of corresponding image derivatives $\delta^x$ 821, $\delta^y$ 823, $\delta^z$ 825, and $\delta^w$ 827 associated with different orientations. A first plurality of orientation maps 806 may then be obtained by applying the ( )⁺ operator to each of the values of the image derivatives. Each orientation map 812 (of the set of orientation maps 806) is then smoothed by convolving it with a smoothing function $g_{\alpha_1\sigma_1}$ which has a second smoothing/scaling coefficient $\alpha_1$. The overall or resulting smoothing coefficient of the set of smoothed orientation maps $I_1^\Sigma$ 821 may be represented as the combination or product of the first smoothing/scaling coefficient $\sigma_1$ and a second smoothing/scaling coefficient $\alpha_1$, such that a smoothed (convolved) orientation map $I_1^\Sigma$ 821 may be represented as:

$$I_1^\Sigma = \left(\frac{\partial I}{\partial o}\right)^+ * g_{\alpha_1\sigma_1}.$$ (Equation 11)

In the example of FIG. 8, the orientation map 812 associated with a first orientation Z is smoothed to obtain a corresponding smoothed orientation map $I_1^Z$ 814. Similarly, a corresponding smoothed orientation map may be obtained for each map in the plurality of orientation maps 808, 810 and 813. These smoothed orientation maps for all orientations of a first scale space 804 may be represented by $I_1^\Sigma$ 821.

A second scale space 805 may be generated using a third smoothing/scaling coefficient $\sigma_i$ where $\sigma_i=\sigma_2$ for purposes of this example. A second plurality of image derivatives $\delta'^x$, $\delta'^y$, $\delta'^z$, and $\delta'^w$ 811 is obtained by taking the oriented derivative of the second scale space 805. A second plurality of orientation maps 815 may then be obtained by applying the ( )⁺ operator to the second plurality of image derivatives $\delta'^x$, $\delta'^y$, $\delta'^z$, and $\delta'^w$ 811. Each of the second plurality of orientation maps 815 is then smoothed by convolving it with a smoothing function $g_{\alpha_j\sigma_2}$ which has a fourth smoothing/scaling coefficient $\alpha_j$. The fourth smoothing coefficient $\alpha_j$ may be the same as the second smoothing coefficient $\alpha_1$ (e.g., $\alpha_j=\alpha_1$), such that the same smoothing coefficient is used at all scale space levels. In other implementations, the fourth smoothing coefficient $\alpha_j$ may be different for every scale space level (e.g., $\alpha_j=\alpha_2$ or $\alpha_j=\alpha_3$). Here, the overall scaling factor $\alpha_1\sigma_2$ of the smoothing function $g_{\alpha_1\sigma_2}$ is represented relative to the original image I(x, y) 801 as the combination or product of the third smoothing/scaling coefficient $\sigma_i=\sigma_2$ (for the scale space) and the first smoothing/scaling coefficient $\alpha_1$. The second plurality of orientation maps 815 are smoothed (e.g., by a convolution operation) to obtain a corresponding smoothed orientation maps $I'_1^\Sigma$ 824, such that $$I'_1^\Sigma = \left(\frac{\partial I'}{\partial o}\right)^+ * g_{\alpha_1\sigma_2}.$$ (Equation 12)

For example, the orientation map 817 associated with the first orientation Z is smoothed to obtain a corresponding smoothed orientation map $I'_1^Z$ 816.

Similarly, a corresponding smoothed orientation map may be obtained for each orientation map in a plurality of orientation maps associated with higher scale spaces of the scale space pyramid 802. For example, for a third set of orientation maps 819, a set of corresponding smoothed orientation maps $I''_1^\Sigma$ 826 is obtained by convolving with a smoothing function $g_{\alpha_1\sigma_k}$ having a fifth smoothing/scaling coefficient $\alpha_h$. The fifth smoothing coefficient $\alpha_h$ may be the same as the first smoothing coefficient $\alpha_1$ (e.g., $\alpha_h=\alpha_1$) or different for every scale space level (e.g., $\alpha_h=\alpha_4$ or $\alpha_h=\alpha_5$). Here, the overall scaling factor $\alpha_1\alpha_k$ of the smoothing function $g_{\alpha_1\sigma_2}$ is represented relative to the original image I(x, y) 801 as the combination or product of a sixth smoothing/scaling coefficient $\sigma_k=\sigma_3$ (for the scale space) and the fifth smoothing/scaling coefficient $\alpha_h=\alpha_1$. For example, an orientation map 820 associated with the first orientation Z is smoothed to obtain a corresponding smoothed orientation map $I''_1^Z$ 818.

Consequently, rather than obtaining first, second, and third smoothed orientation maps $I_1^\Sigma$ 215, $I_2^\Sigma$ 217, and $I_3^\Sigma$ 219 (FIG. 2) for each set of orientation maps 206, the implementation illustrated in FIG. 8 specifically selects scale space levels at higher levels of the scale space pyramid 802 that will provide an approximate convolved scale space smoothing with which to generate a Daisy descriptor.

To properly select a higher scale space from the scale space pyramid 802, it is observed that a smoothed orientation map can be represented as, $$\frac{\partial I}{\partial o} * g_{\alpha_2 \sigma_1} = \frac{\partial}{\partial o}[I * g_{\alpha_2 \sigma_1}] \qquad \text{(Equation 13)}$$

$$= \frac{\partial}{\partial o}\left[I * g_{\sqrt{\sigma_2^2 - \sigma_1^2}}\right] * g_{\alpha_1 \sigma_2}, \qquad \text{(Equation 14)}$$

where $\sigma_1$ and $\sigma_2$ are scaling/smoothing coefficients for different scale spaces of the scale space pyramid and $\sigma_2$ provides greater smoothing/scaling than $\sigma_1$. Similarly, $\alpha_i$ and $\alpha_2$ are scaling/smoothing coefficients used to generate two different smoothed orientation maps and $\alpha_2$ provides greater smoothing/scaling than $\alpha_1$.

To build the descriptors, the smoothed orientation maps are obtained by applying the ( )$^+$ operator to clip the negative components from the corresponding image derivative. In FIG. 2, the smoothed orientation map $I_2^\Sigma$ 217 may be obtained as:

$$I_2^\Sigma = \left(\frac{\partial I}{\partial o}\right)^+ * g_{\alpha_2 \sigma_1}.$$

This smoothed orientation map $I_2^\Sigma$ 217 may be approximated by applying the clipping function to a smooth version of the image such that:

$$\left(\frac{\partial}{\partial o}\left[I * g_{\sqrt{\sigma_2^2 - \sigma_1^2}}\right]\right)^+ * g_{\alpha_1 \sigma_2}. \qquad \text{(Equation 14.1)}$$

In practice, this approximation generates more robust descriptors, as the derivative is applied to a smoother version (i.e., higher scale) of the image.

In one embodiment, the overall smoothing/scaling of the smoothing function $g_{\alpha_x \sigma_x}$ (relative to the original image I(x, y)) may simply be represented as a smoothing/scaling coefficient $\sigma_x \alpha_x$. Thus, Equations 13 and 14 may be determined by adjusting the smoothening kernel parameters (e.g., scaling coefficients $\sigma$ and $\alpha$) as follows, $$\alpha_2 \sigma_1 = \sqrt{\sigma_2^2 - \sigma_1^2} + \alpha_1 \sigma_2 \qquad \text{(Equation 15)}$$

$$(\alpha_2 \sigma_1)^2 = \sigma_2^2 - \sigma_1^2 + (\alpha_1 \sigma_2)^2 \qquad \text{(Equation 16)}$$

This results in $$(1+\alpha_2^2)\sigma_1^2 = (1+\alpha_1^2)\sigma_2^2 \qquad \text{(Equation 17)}$$

Let $\sigma_2/\sigma_1 = \lambda_1$ then, $$(1+\alpha_2^2) = (1+\alpha_1^2)\lambda_1^2 \qquad \text{(Equation 18)}$$

Here $\lambda_1$ corresponds to the ratio between the smoothing coefficients $\sigma_2$ and $\sigma_1$ for two scale space levels of a scale space pyramid. From Equations 14.1 and 18 it can be appreciated that for a first smoothed orientation map of a first scale space, a second smoothed orientation map can be selected by going up $\lambda_1$ levels from the first scale space on the scale space pyramid to a second scale space. Thus, instead of using the second smoothed orientation map $I_2^\Sigma$ 217 (FIG. 2) as a second level of a Daisy descriptor, this second level can be obtained by going $\lambda_1$ levels up in the scale space pyramid 802 and using the corresponding scale space 805 to derive a corresponding smoothed orientation map $I'_1^\Sigma$ 824 used to generate the Daisy descriptor. Note that, in the example illustrated in FIG. 8, the same scaling coefficient $\alpha_1$ may be used for smoothing the orientation maps of all levels of the scale space pyramid 802.

The same procedure can be used to define the relation between $\alpha_1$ and $\alpha_3$ based on $\lambda_2$. That is, if $\sigma_3/\sigma_1 = \lambda_2$ then, $$(1+\alpha_3^2) = (1+\alpha_1^2)\lambda_2^2 \qquad \text{(Equation 19)}$$

Consequently, instead of using the third smoothed orientation map $I_3^\Sigma$ 219 (FIG. 2) as a third level of a Daisy descriptor, this third level can be obtained by going $\lambda_2$ levels up in the scale space pyramid 802 and using the corresponding scale space 807 to derive a corresponding smoothed orientation map $I'_1^\Sigma$ 826 used to generate the Daisy descriptor.

Figure 9:
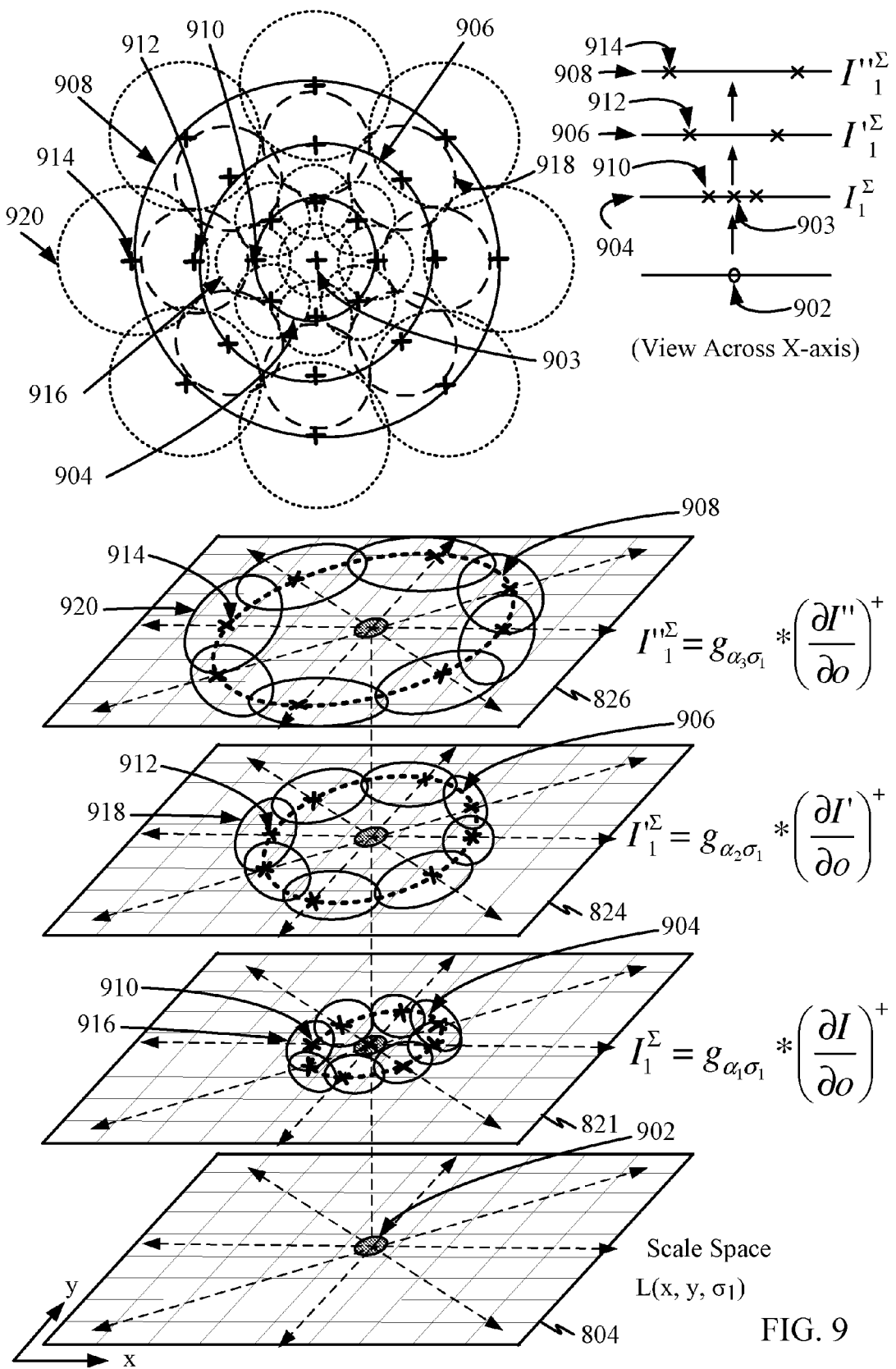
FIG. 9 illustrates how a Daisy descriptor may be generated by using multiple levels of a scale space pyramid.

FIG. 9 illustrates how a Daisy descriptor may be generated by using multiple levels of a scale space pyramid. For an identified point 902 in a first scale space 804, a Daisy descriptor may be generated by sparsely sampling a corresponding smoothed orientation map $I_1^\Sigma$ 821 (generated from the first scale space 804 and corresponding image derivatives), and one or more additional smoothed orientation maps $I_2^\Sigma$ 826 and $I_3^\Sigma$ 824 at one or more higher scale spaces 805 and 807 of the scale space pyramid 802. This may be achieved by a spatial pooling configuration (e.g., Gaussian pooling) distributed over a center of the point 902. In this example, the spatial pooling configuration may be defined as a plurality of concentric rings 904, 906, and 908 on different smoothed orientation maps $I_1^\Sigma$ 821, $I_2^\Sigma$ 826 and $I_3^\Sigma$ 824. The concentric rings 904, 906, and 908 are concentric relative to a sample point 903 on the smoothed orientation map $I_1^\Sigma$ 821 (which coincides with the location of the point 902). Each concentric ring 904, 906, and 908 may include a plurality of sparsely sampled points 910, 912, and 914 along the perimeter of the ring. Each sparsely sampled point 910, 912, and 914 may serve as the center for a cell 916, 918, and 920 (i.e., circle), where the cell size (i.e., radius) increases in size as the sample points move further away from the point 902. In one example, the spatial pooling configuration may include twenty-four (24) points along the three (3) concentric rings 904, 906, and 908, with eight (8) sample points (e.g., consequently eight cells) per ring 904, 906, and 908 that are separated by forty-five (45) degrees. Each smoothed orientation map $I_1^\Sigma$ 821, $I_2^\Sigma$ 824, and $I_3^\Sigma$ 826 may include a set or plurality of orientation-specific smoothed orientation maps (e.g., orientations X, Y, Z, W, etc.). The (x) marks correspond to the sampled points or locations around the point (o) 902 to build the modified Daisy descriptor. This operation is done for each orientation leading to a histogram of oriented gradients (HOG). A Daisy descriptor (e.g., orientation histogram) may then be built by including information about each of the sample points. For instance, a histogram $h_\Sigma$ (u,v) for the point 902 located at image coordinates $(u_0, v_0)$ may be represented as a vector such that:

$$h_\Sigma(u,v) = [I_1^\Sigma(u,v), I'_1^\Sigma(u,v), I''_1^\Sigma(u,v)]^T \qquad \text{(Equation 20)}$$

where $$I_1^\Sigma(u,v) = [I_1^X(u,v), I_1^Y(u,v), I_1^Z(u,v), \ldots, I_1^W(u,v)], \qquad \text{(Equation 21A)}$$

$$I'_1^\Sigma(u,v) = [I'_1^X(u,v), I'_1^Y(u,v), I'_1^Z(u,v), \ldots, I'_1^W(u,v)], \qquad \text{(Equation 21B)}$$

$$I''_1^\Sigma(u,v) = [I''_1^X(u,v), I''_1^Y(u,v), I''_1^Z(u,v), \ldots, I''_1^W(u,v)], \qquad \text{(Equation 21C)}$$

for a plurality of orientations. Here $I_1^\Sigma$, $I'_1^\Sigma$, and $I''_1^\Sigma$ denote the smoothed orientation maps associated with different scale spaces. In particular, the smoothed orientation maps $I'_1^\Sigma$ and $I''_1^\Sigma$ may be associated with higher scale spaces than the base smoothed orientation map $I_1^\Sigma$. As before, the vector $h_\Sigma(u, v)$ may be normalized to a unit and denoted as $\tilde{h}_\Sigma(u, v)$.

The Daisy descriptor for a point may be defined by a vector made of values from the smoothed orientation maps located on the concentric circles centered on the location of the point 902, and where the amount of smoothing may be proportional to a radii of the circles. Thus, the Daisy descriptor for a point at location (u, v) may be given as $$D(u,v)=$$

$$[\tilde{h}_{\Sigma_1}^T(u,v),$$

$$\tilde{h}_{\Sigma_1}^T(l_1(u,v,R_1)), \ldots \tilde{h}_{\Sigma_1}^T(l_v(u,v,R_1)),$$

$$\tilde{h}_{\Sigma_2}^T(l_1(u,v,R_2)), \ldots \tilde{h}_{\Sigma_2}^T(l_v(u,v,R_2)),$$

$$\tilde{h}_{\Sigma''_3}^T(l_1(u,v,R_3)), \ldots \tilde{h}_{\Sigma''_3}^T(l_v(u,v,R_3))],$$ (Equation 22)

where $l_j(u, v, R_i)$ is the pixel location with distance $R_j$ from the point 902 at location (u, v) in a direction/orientation given by j (e.g., four direction, eight directions, etc.). Here, the subscript "V" represents the number of histograms at a single smoothed orientation map level. For the example in FIG. 9, this is eight (8) histograms per layer. Note that Equations 21A, 21B, 21C, and 22 assume that three (3) smoothed orientation map levels are used, but additional numbers of levels may be used in other implementations.

In one example, the scale space levels of the pyramid 802 may be defined as $2^{k/S}$, where S defines the resolution of each octave (i.e., number of scale levels per octave) and s is the scale space level within the scale space pyramid 802, then $\lambda_1$ can be selected from $2^{k/S}$ for some positive integer k. For instance, in FIG. 8 the octave resolution S is i+1 (i.e., from scale levels 0 to i), where "i" is an integer (e.g., 2, 3, 4, 5, 6, 7, etc.) while the scale level s may be between 1 and r+1 (i.e., the highest scale level in the pyramid 802). Note that other methods of defining pyramid scale space levels may be used.

The approach of generating a Daisy descriptor by reusing smoothed orientation maps for other scale spaces not only achieves savings in memory storage space, but also improvements in accuracy. One feature of this approach is to determine which level of smoothing was applied to the derivative operator. In this approach, the derivative operator is applied to an image at a higher scale level of the Gaussian pyramid. Hence, this approach is more robust to noise. This is because smoothing the image with a larger kernel eliminates the high frequency noise which may be amplified by the derivative operation. This fact has been used by all well-known edge detection algorithms.

Exemplary Comparison Between Typical and Modified Daisy Descriptor

Figure 10B:
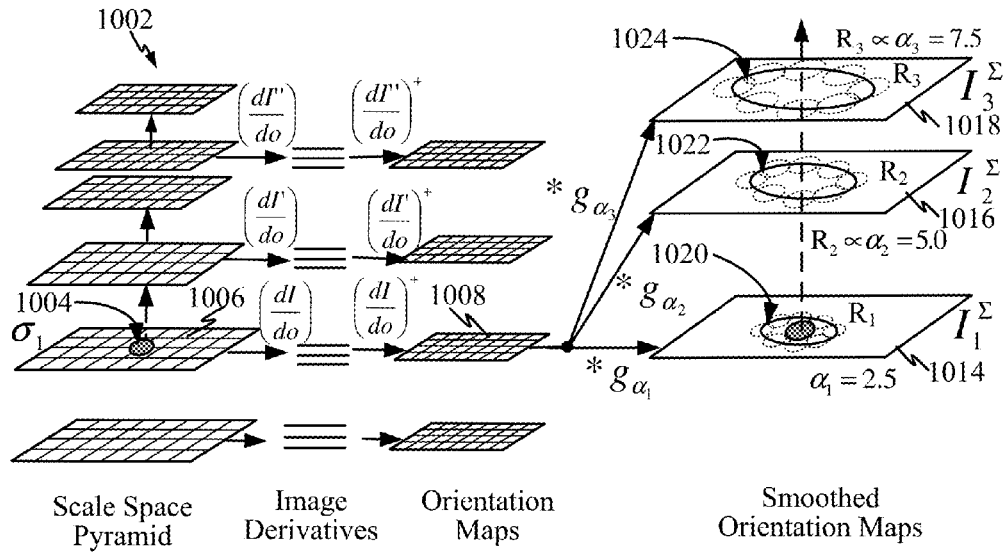
Figure 10B:
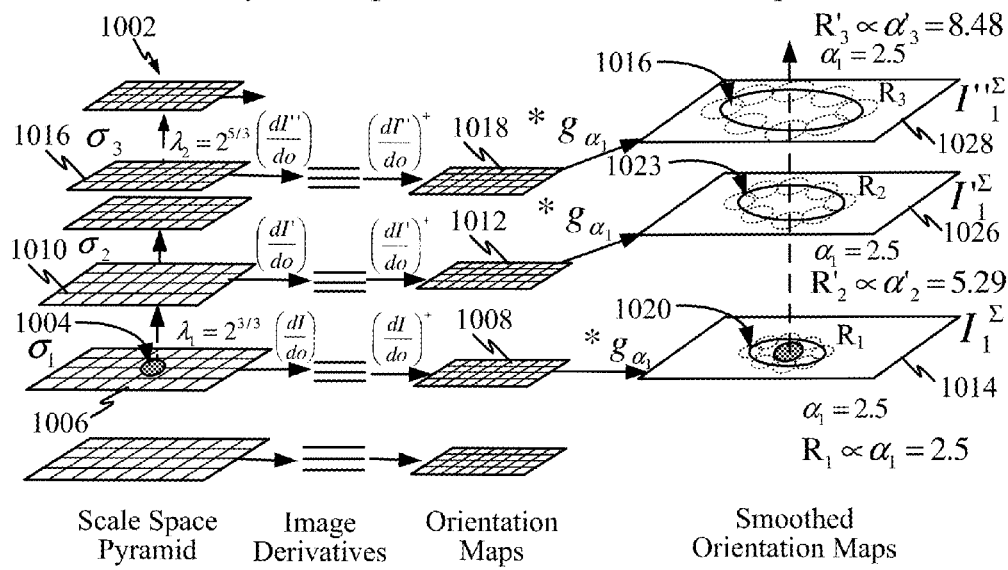

FIGS. 10A-10B illustrate a comparison of the generation of a typical Daisy descriptor in comparison to a modified Daisy descriptor over scale space. A scale space pyramid 1002 is generated by blurring/smoothing an image according to various scaling coefficients, such that the image resolution decreases from lower scales to higher scales of the pyramid 1002. A typical Daisy descriptor for a point 1004 at a first scale space 1006 (generated by a first scaling coefficient $\sigma_1$) may be generated by taking the oriented derivative of the first scale space 1006 to obtain a set of orientation maps 1008. The set of orientation maps 1008 comprises a plurality of orientation maps for different orientations. The set of orientation map 1008 are then smoothed by convolving with a plurality of different scaling/smoothing coefficients to obtain three levels of the Daisy descriptor. In this example, three different smoothed orientation maps $I_1^\Sigma$ 1014, $I_2^\Sigma$ 1016, and $I_3^\Sigma$ 1018 are obtained from a single set of orientation maps 1008 by convolving with smoothing coefficients $\alpha_1$, $\alpha_2$, and $\alpha_3$. Note that the set of orientation maps 1008 may include a plurality of orientation maps (e.g., one map per orientation). Consequently, each of different smoothed orientation maps $I_1^\Sigma$ 1014, $I_2^\Sigma$ 1016, and $I_3^\Sigma$ 1018 may actually include a plurality of smoothed orientation maps (e.g., eight (8) orientations times three (3) smoothed orientation maps per orientation).

The first smoothed orientation map $I_1^\Sigma$ 1014 is used as the first level of the Daisy descriptor, the second smoothed orientation map $I_2^\Sigma$ 1016 is used as the second level of the Daisy descriptor, and the third smoothed orientation map $I_3^\Sigma$ 1018 is used as the third level of the Daisy descriptor. Each of the smoothed orientation maps $I_1^\Sigma$ 1014, $I_2^\Sigma$ 1016, and $I_3^\Sigma$ 1018 includes a ring 1020, 1022, and 1024 concentric with the point 1004. Each concentric ring 1020, 1022, and 1024 may include a plurality of sparsely sampled points along the perimeter of the ring. Each sparsely sampled point may serve as the center for a cell (i.e., circle), where the cell size (i.e., radius) increases in size as the sample points move further away from the point 1004. In this example, the three different smoothing coefficients $\alpha_1$, $\alpha_2$, and $\alpha_3$ (for smoothed orientation maps 1014, 1016, and 1018, respectively) may have values $\alpha_1$=2.5, $\alpha_2$=5.0, and $\alpha_3$=7.5. The radius of each of the cells (i.e., circles) may be proportional to the smoothing coefficient for that smoothed orientation map. For example, for the first smoothed orientation map 1014, the radius $R_1$ of each cell or circle may be $R_1$=2.5, where there is a one-to-one proportionality with the smoothing coefficient $\alpha_1$=2.5. Similarly, for the second smoothed orientation map 1016, the radius $R_2$ of each cell or circle may be $R_2$=5.0, where there is a one-to-one proportionality with the smoothing coefficient $\alpha_2$=5.0. Likewise, for the third smoothed orientation map 1018, the radius $R_3$ of each cell or circle may be $R_3$=7.5, where there is a one-to-one proportionality with the smoothing coefficient $\alpha_3$=7.5. Note that the sum of the radii $R_1+R_2+R_3$=15.0 pixels in this example. A Daisy descriptor may then be generated according to Equations 3, 4A, 4B, 4C, and 5. Due to the construction of the typical Daisy descriptor, for an image of M×N pixels, a scale space pyramid of S levels, and eight orientations, it takes 24×M×N×S memory to store the information for three (3) smoothed orientation maps for the eight oriented derivatives (e.g., orientation maps).

In comparison to the typical method for generating a Daisy descriptor, the present approach uses a plurality of levels of the scale space pyramid 1002 to generate the Daisy descriptor over the scale space. For example, even for the same scale space pyramid 1002, just one (first) smoothed orientation map $I_1^\Sigma$ 1014 is generated for the set of orientation maps 1008 corresponding to the first scale space 1006 in which the point 1004 is found. In one implementation, the first smoothed orientation map $I_1^\Sigma$ 1014 may be smoothed by the same scaling coefficient $\alpha_1$. In this method for generating a Daisy descriptor in scale space, a second scale space 1010 is selected from the scale space pyramid 1010 and its corresponding smoothed orientation map $I'_1^\Sigma$ 1026 (generated from a second set of orientation maps 1012) is used as the second level for the Daisy descriptor. Similarly, a third scale space 1014 is selected from the scale space pyramid 1010 and its corresponding smoothed orientation map $I''_1^\Sigma$ 1028 (generated from a third set of orientation maps 1016) is used as the third level for the Daisy descriptor.

The second scale space 1010 is specifically selected so that the overall smoothing of the corresponding smoothed orientation map $I'_1^\Sigma$ 1026, is the same or approximately the same as that of the second smoothed orientation map $I_2^\Sigma$ 1016. In this example, the same smoothing coefficient $\alpha_1$ is used for generating the first and second smoothed orientation maps 1014 and 1026. Consequently, selection of the second smoothed orientation map 1026 is based on the ratio $\lambda_1$ between the overall smoothing of the second smoothed orientation maps $I_2^+$ and the first smoothed orientation map $I_1^\Sigma$ 1014. Since the same smoothing coefficient $\alpha_1$ is used for generating the first and second smoothed orientation maps 1014 and 1026, selection of a second scale space 1010 that satisfies the ratio $\lambda_1 = \sigma_2/\sigma_1$ will have the effect of achieving the same or approximately the same overall smoothing at the corresponding second smoothed orientation map 1026. The ratio $\lambda_1$ may have been pre-determined to achieve a desired spatial sampling for the modified Daisy Descriptor or to approximately match a typical Daisy descriptor. Thus, knowing the ratio $\lambda_1$ and smoothing coefficient $\sigma_1$, the second scale space 1010 can be selected based on its corresponding smoothing coefficient $\sigma_2$ that satisfies the ratio $\lambda_1$. Because scale spaces may be predetermined for the scale space pyramid 1010, the second scale space 1010 that most closely satisfies this ratio $\lambda_1$ is selected. Note that constructing the scale space pyramid 1002 with finely spaced scale spaces helps in being able to select a second scale space 1010 having a smoothing coefficient $\sigma_2$ that satisfies the ratio $\lambda_1$.

Similarly, the third scale space 1016 is specifically selected so that the overall smoothing of the corresponding smoothed orientation map $I''_1^\Sigma$ 1028 is the same or approximately the same as that of the third smoothed orientation map $I_3^\Sigma$ 1016. In this example, the same smoothing coefficient $\alpha_1$ is used for generating the first and third smoothed orientation maps 1014 and 1028. Consequently, selection of the third smoothed orientation map 1028 is based on the ratio $\lambda_2$ between the overall smoothing of the third smoothed orientation maps $I_3^\Sigma$ and the first smoothed orientation map $I_1^\Sigma$ 1014. Since the same smoothing coefficient $\alpha_1$ is used for generating the first and third smoothed orientation maps 1014 and 1028, selection of a second scale space 1016 that satisfies the ratio $\lambda_2 = \sigma_3/\sigma_1$ will have the effect of achieving the same or approximately the same overall smoothing at the corresponding third smoothed orientation map 1028. The ratio $\lambda_2$ may have been pre-determined to achieve a desired spatial sampling for the modified Daisy Descriptor or to approximately match a typical Daisy descriptor. Thus, knowing the ratio $\lambda_2$ and smoothing coefficient $\sigma_1$, the third scale space 1016 can be selected based on its corresponding smoothing coefficient $\sigma_3$ that satisfies the ratio $\lambda_2$. Because scale spaces may be predetermined for the scale space pyramid 1010, the third scale space 1016 that most closely satisfies this ratio $\lambda_2$ is selected.

In this manner, smoothed orientation maps $I_1^\Sigma$ 1014, $I'_1^\Sigma$, 1026, and $I''_1^\Sigma$ 1028, corresponding to different scale spaces, may be used as the first, second, and third levels of the modified Daisy descriptor. As before, the radius of each of the cells (i.e., circles) sampled at each of the smoothed orientation maps $I_1^\Sigma$ 1014, $I'_1^\Sigma$ 1026, and $I''_1^\Sigma$ 1028 may be proportional to the smoothing coefficient for that smoothed orientation map. In this example, for the first smoothed orientation map 1014, the radius $R_1$ of each cell or circle may be $R_1 = \alpha_1 = 2.5$, where there is a one-to-one proportionality with the smoothing coefficient $\alpha_1 = 2.5$. The radii $R'_2$ and $R'_3$ (for the second and third smoothed orientation maps 1026 and 1028) will now depend on the overall smoothing achieved as a result of the selection of the second and third scale spaces 1010 and 1016. For the second smoothed orientation map $I'_1^\Sigma$ 1026, where the ratio $\lambda_1 = 2^{3/3}$ and $\alpha_1 = 2.5$, the equivalent smoothing coefficient $\alpha'_2 = 5.29$ and the radius $R'_2 = \alpha'_2 = 5.29$, where there is a one-to-one proportionality with the smoothing coefficient $\alpha'_2$. Likewise, for the third smoothed orientation map $I''_1^\Sigma$ 1028, where the ratio $\lambda_2 = 2^{5/3}$ and $\alpha_1 = 2.5$, the equivalent smoothing coefficient $\alpha'_3 = 8.48$ and the radius $R'_3 = \alpha'_3 = 8.48$, where there is a one-to-one proportionality with the smoothing coefficient $\alpha'_3$. Note that the sum of the radii $R_1 + R'_2 + R'_3 = 16.27$ pixels in this example. A Daisy descriptor may then be generated according to Equations 20, 21A, 21B, 21C, and 22. Due to the construction of this modified Daisy descriptor, for an image of M×N pixels, a scale space pyramid of S levels, and eight orientations, it takes 8×M×N×S memory to store the information for the smoothed orientation map for the eight oriented derivatives (e.g., orientation maps).

Exemplary Descriptor Generation Device

Figure 11:
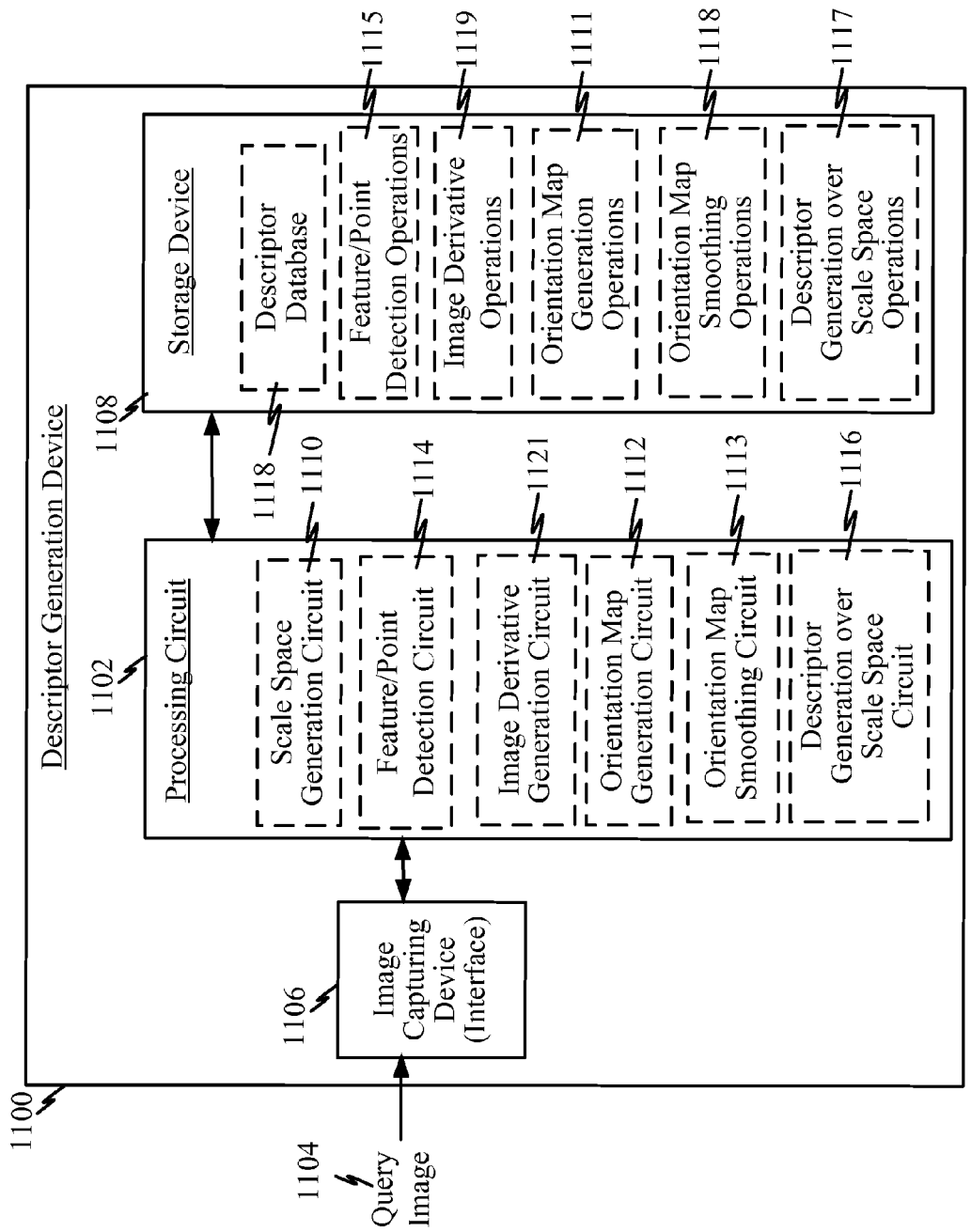
FIG. 11 is a block diagram illustrating an example of a descriptor generation device that generates a descriptor over a plurality of scale space levels.

FIG. 11 is a block diagram illustrating an example of a descriptor generation device that generates a descriptor over a plurality of scale space levels. The descriptor generation device 1100 may include a processing circuit 1102, an image capturing device 1106, and/or a storage device 1108. The image capturing device 1106 may be, for example, a digital camera that can capture a query image, a storage media storing one or more digital images, and/or a communication interface that provides one or more digital images.

The storage device 1108 may serve to temporarily or permanently store a descriptor database 1118, a set of feature/point detection operations 1115, a set of image derivative operations 1119, a set of orientation map generation operations 1111, a set of orientation map smoothing operations 1118, and/or a set of descriptor generation over scale space operations 1117.

The processing circuit 1102 may be adapted to process an image and generate one or more descriptors identifying the image and/or features within the image. For this purpose, the processing circuit 1102 may also include or implement a scale space generation circuit 1110, a feature/point detection circuit 1114, an image derivative generation circuit 1121, an orientation map generation circuit 1112, an orientation map smoothing circuit 1113, and/or a descriptor generation over scale space circuit 1116. The processing circuit 1102 may implement one or more features and/or methods described in FIGS. 8-10 and 12. In one example, the processing circuit 1102 may simply implement the operations in stored in the various modules in the storage device. In another example, each of the circuits within the processing circuit 1102 may be adapted to carry out the operations in a corresponding modules stored within the storage device 1108.

The scale space generation circuit 1110 may serve to convolve an image with a blurring/smoothing function to generate a plurality of different scale spaces as illustrated, for example, in FIG. 8. In one example, the scale space generation circuit 1110 may serve to generate a Gaussian scale space pyramid. The feature/point detection circuit 1114 may serve to identify some or all points or features at each scale space for the image. The image derivation generation circuit 1121 may serve to generate a plurality of oriented derivatives for each of the scale spaces. The orientation map generation circuit 1112 may serve to generate an orientation map for each image derivative. The orientation map smoothing circuit 1113 may then smoothen each of the orientation maps (e.g., by a convolution operation). The descriptor generation over scale space circuit 1116 generates a descriptor for a point by using sampling points on a plurality of smoothed orientation maps for a plurality of different scale spaces. For instance, the descriptor generation over scale space circuit 1116 may generate a modified Daisy descriptor as illustrated in FIGS. 8-10 and 12.

Figure 12:
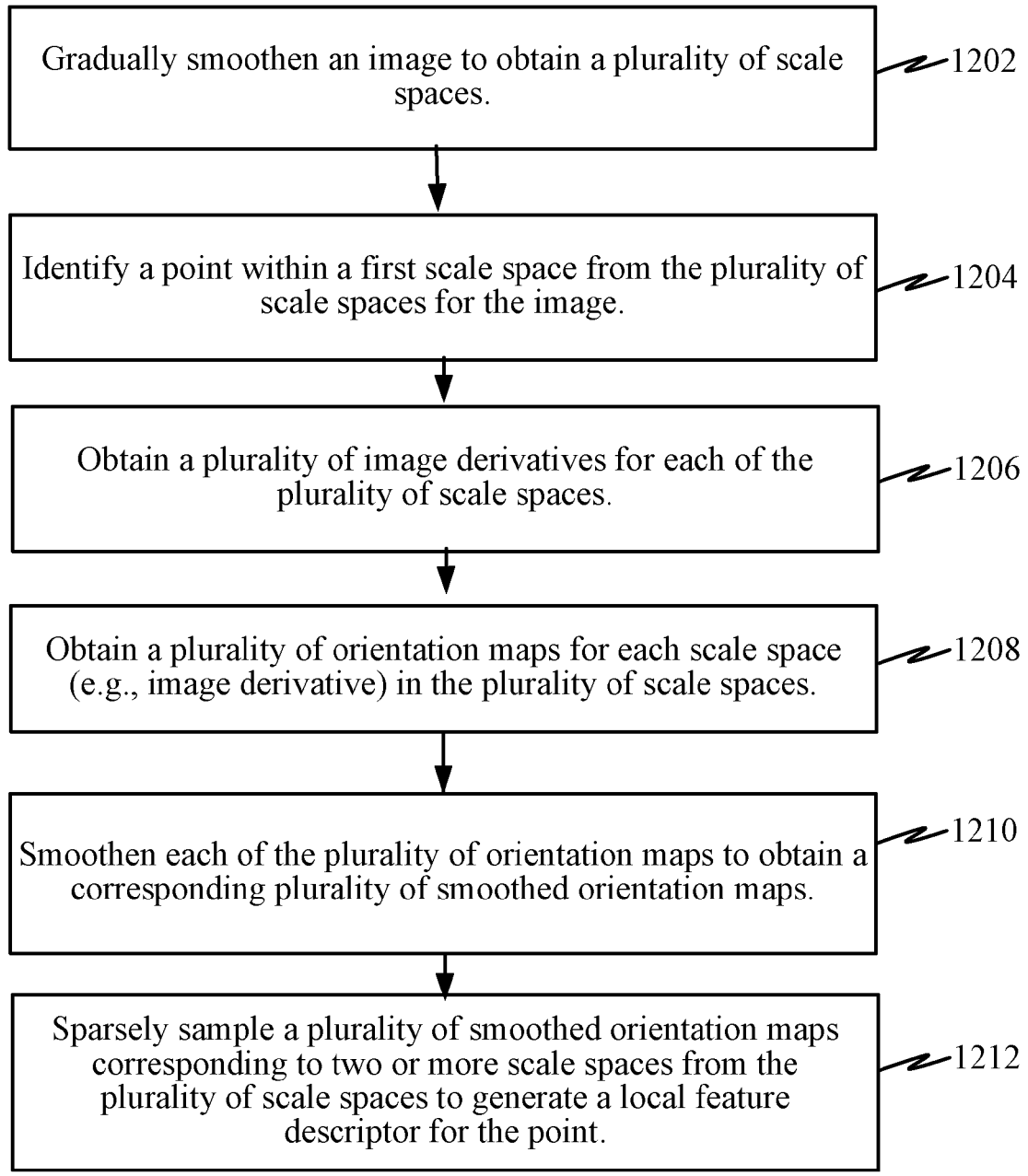
FIG. 12 is a flow diagram illustrating a method for generating a local feature descriptor over a plurality of scale space levels.

FIG. 12 is a flow diagram illustrating a method for generating a local feature descriptor over a plurality of scale space levels. This method may be implemented in various devices, including the descriptor generation device 1100 of FIG. 11, to generate a local feature descriptor for a point. An image I(x, y) is gradually smoothed to obtain a plurality of scale spaces $L(\sigma_i)$, $L(\sigma_2)$, . . . $L(\sigma_n)$ 1202.

A point may be identified within a first scale space from the plurality of scale spaces 1204. The point may be a sample point from a subset of locations within the plurality of scale spaces. Selection of the subset of locations may depend on the particular implementation. In one example, the subset of locations may be selected based on an expected pattern for an object. For instance, in face detection applications, these locations would correspond to the location of the eyes, mouth, nose with respect to a reference location, such as center of a face. In another example, the subset of locations may be selected based on identified keypoints within the image, wherein a keypoint is a point that has been identified as being robust to rotation and scale changes. For instance, to implement shape extraction from images, the locations may correspond to points sampled from a contour of a shape.

Oriented image derivatives are obtained for each of the plurality of scale spaces 1206.

A plurality of orientation maps $$\left(\frac{\partial I}{\partial o}\right)^+, \left(\frac{\partial I'}{\partial o}\right)^+, \text{ and } \left(\frac{\partial I''}{\partial o}\right)^+$$

are then obtained (e.g., by taking oriented derivatives of the image and clipping the negative values) for each scale space $L(\sigma_i)$ in the plurality of scale spaces 1208. For example, each of the plurality of orientation maps may be obtained by setting any negative values of a corresponding image derivative to zero (e.g., by applying a clipping function/operator $(.)+$ to the orientation map).

Each of the plurality of orientation maps $$\left(\frac{\partial I}{\partial o}\right)^+, \left(\frac{\partial I'}{\partial o}\right)^+, \text{ and } \left(\frac{\partial I''}{\partial o}\right)^+$$

is then smoothed (e.g., by a convolution operation) to obtain a corresponding plurality of smoothed orientation maps $I_o^\Sigma$, $I'_o^\Sigma$, and $I''_o^\Sigma$ 1210.

A plurality of smoothed orientation maps corresponding to two or more scale spaces from the plurality of scale spaces are then sparsely sampled to generate a local feature descriptor for the point 1212. The two or more scales spaces may include the first scale space and one or more additional scale spaces of lower resolution than the first scale space. The local feature descriptor may have a kernel pooling configuration defined by spatial pooling of sample points distributed over a center of the point. The plurality of orientation maps for each scale space may include orientation maps for a plurality of different orientations (e.g., orientations/dimensions X, Y, Z, and W). Each orientation map $$\left(\frac{\partial I}{\partial o}\right)^+$$

may resolve to a single corresponding smoothed orientation map $I_o^\Sigma$. A plurality of histograms of oriented gradients may be built from the sparse sampling of the plurality of smoothed orientation maps, wherein the local feature descriptor comprises the plurality of histograms.

In one example, sparsely sampling a plurality of smoothed orientation maps includes (a) sampling a first plurality of points on a first smoothed orientation map, the first plurality of points arranged in a first ring concentric with a location of the point; (b) sampling a second plurality of points on a second smoothed orientation map, the second plurality of points arranged in a second ring concentric with the location of the point, the second smoothed orientation map corresponding to a second scale space of lower resolution than the first scale space; and/or (c) sampling a third plurality of points on a third smoothed orientation map, the third plurality of points arranged in a third ring concentric with the location of the point, the third smoothed orientation map corresponding to a third scale space of lower resolution than the first scale space. The second ring may have a second radius greater than a first radius for the first ring, and the third ring may have a third radius greater than the second radius for the second ring.

According to one instance, a plurality of orientation maps may be smoothed using the same smoothing coefficient, the first scale space may be one of the two or more scale spaces, and a second scale space may be selected to achieve a desired smoothing relative to the first scale space.

Exemplary Mobile Device

Figure 13:
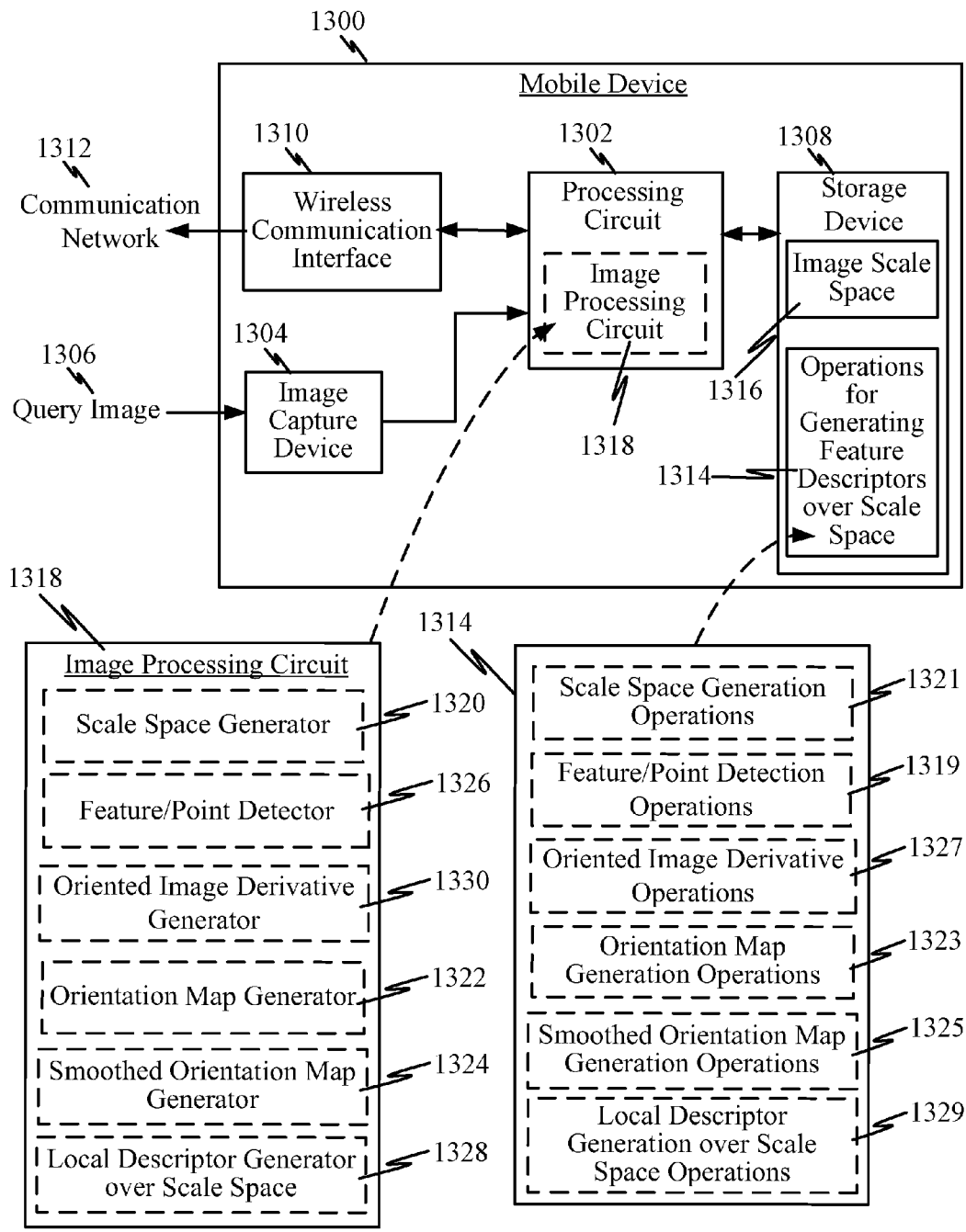
FIG. 13 is a block diagram illustrating an exemplary mobile device adapted to perform image processing for purposes of image or object recognition using a local descriptor generated over multiple levels of a scale space.

FIG. 13 is a block diagram illustrating an exemplary mobile device adapted to perform image processing for purposes of image or object recognition using a local descriptor generated over multiple levels of a scale space. The mobile device 1300 may include a processing circuit 1302 coupled to an image capture device 1304, a wireless communication interface 1310 and a storage device 1308. The image capture device 1304 (e.g., digital camera) may be adapted to capture a query image 1306 of interest and provide it to the processing circuit 1302.

The storage device 1308 (e.g., volatile and/or non-volatile memory) may store an image scale space 1316 and/or operations for generating local feature descriptors over scale space 1314 for an image. These operations may include, for example, scale space generation operations 1321 (e.g., operations that progressively blur an image according to various smoothing coefficients/functions to obtain a scale space of an image), oriented image derivative operations 1327 (e.g., operations that generate a plurality of oriented derivatives from a particular scale space level), orientation map generation operations 1323 (e.g., operations that apply a clipping function $(.)^+$ to pixel gradient values of the image derivative to obtain an orientation map), smoothed (convolved) orientation map generation operations 1325 (e.g., apply a second smoothing coefficient to the orientation maps), and/or local descriptor generation over scale space operations 1329 (e.g., sparsely sampling a plurality of smoothed orientation maps corresponding to two or more scale spaces from the plurality of scale spaces). These operations may be executed by the processing circuit 1302 for example.

The processing circuit 1302 may be adapted to process the captured image to generate local feature descriptors that can be subsequently transmitted or used for image/object recognition. For example, the processing circuit 1302 may include or implement a scale space generator 1320, a feature/point detector 1326, an oriented image derivative generator an orientation map generator 1322, a smoothed orientation map generator 1324, and/or a local feature descriptor generator over scale space 1328. The scale space generator 1320 may serve to convolve an image with a blurring function (e.g., Gaussian kernel) to generate a plurality of different scale spaces as illustrated, for example, in FIG. 8. The feature/point detector 1326 may then identify one or more points in the different scale spaces for the image (e.g., by using local maxima and minima). The oriented image derivative generator 1330 may then take the oriented derivative of the scale spaces to generate a plurality of image derivatives. The orientation map generator 1322 may generate an orientation map for each image derivative by applying a clipping function ( ) to the values of the image derivative. The smoothed orientation map generator 1324 then further convolves each orientation map to obtain a corresponding smoothed orientation map. The local feature/point descriptor generator 1328 generates a descriptor (e.g., Daisy descriptor) for each point of interest (e.g., illustrated in FIGS. 8, 9, and 10) by using smoothed orientation maps for a plurality of scale spaces. The mobile device 1300 may implement one or more features and/or methods described in those figures.

The processing circuit 1302 may then store the one or more local feature/point descriptors in the storage device 1308 and/or may also transmit the local feature/point descriptors over the wireless communication interface 1310 (e.g., transceiver or circuit) through a communication network 1312 to an image matching server that uses the feature descriptors to identify an image or object therein. That is, the image matching server may compare the feature descriptors to its own database of feature descriptors to determine if any image in its database has the same feature(s).

One or more of the components, steps, features and/or functions illustrated in the figures may be rearranged and/or combined into a single component, step, feature or function or embodied in several components, steps, or functions. Additional elements, components, steps, and/or functions may also be added without departing from novel features disclosed herein. The apparatus, devices, and/or components illustrated in a figure may be configured to perform one or more of the methods, features, or steps described in another figure. The algorithms described herein may also be efficiently implemented in software and/or embedded in hardware.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices and/or other machine-readable mediums, processor-readable mediums, and/or computer-readable mediums for storing information. The terms "machine-readable medium", "computer-readable medium", and/or "processor-readable medium" may include, but are not limited to non-transitory mediums such as portable or fixed storage devices, optical storage devices, and various other mediums capable of storing, containing or carrying instruction(s) and/or data. Thus, the various methods described herein may be fully or partially implemented by instructions and/or data that may be stored in a "machine-readable medium", "computer-readable medium", and/or "processor-readable medium" and executed by one or more processors, machines and/or devices.

Furthermore, embodiments may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. It should be noted that the foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. A method for generating a local feature descriptor for an image, comprising:
    identifying a point within a first scale space from a plurality of scale spaces for an image;
    obtaining a plurality of image derivatives for each of the plurality of scale spaces;
    obtaining a plurality of orientation maps for each scale space in the plurality of scale spaces, where each of the plurality of orientation maps is obtained from non-negative values of a corresponding image derivative;
    for each scale space in the plurality of scale spaces, smoothing each of the plurality of orientation maps to obtain a corresponding plurality of smoothed orientation maps; and
    sparsely sampling a plurality of smoothed orientation maps corresponding to two or more scale spaces from the plurality of scale spaces to generate a local feature descriptor for the point
    wherein each of the smoothed orientation maps that is sparsely sampled is derived using a different orientation map than each of the other smoothed orientation maps that is sparsely sampled.

2. The method of claim 1, further comprising gradually smoothing the image to obtain the plurality of scale spaces.

3. The method of claim 1, wherein said smoothing comprises:
    smoothing each of the plurality of orientation maps for the first scale space by a first smoothing coefficient to generate the corresponding plurality of smoothed orientation maps; and
    smoothing each of the plurality of orientation maps for a second scale space in the plurality of scale spaces by the first smoothing coefficient to generate the corresponding plurality of smoothed orientation maps,
    wherein the second scale space is different than the first scale space.

4. The method of claim 1, wherein the point is a sample point from a subset of locations within the plurality of scale spaces, and
    wherein the subset of locations is selected based on a pattern that represents an object to be detected.

5. The method of claim 1, wherein the point is a sample point from a subset of locations within the plurality of scale spaces, and
    wherein the subset of locations is selected based on identified keypoints within the image, wherein a keypoint is a point that has been identified as being robust to changes in imaging conditions.

6. The method of claim 1, wherein the two or more scale spaces include the first scale space and one or more additional scale spaces of lower resolution than the first scale space.

7. The method of claim 1, wherein the local feature descriptor has a kernel pooling configuration defined by spatial pooling of sample points distributed over a center of the point.

8. The method of claim 1, wherein sparsely sampling a plurality of smoothed orientation maps includes
    sampling a first plurality of points on a first smoothed orientation map, the first plurality of points arranged in a first ring concentric with a location of the point; and
    sampling a second plurality of points on a second smoothed orientation map, the second plurality of points arranged in a second ring concentric with the location of the point, the second smoothed orientation map corresponding to a second scale space of lower resolution than the first scale space.

9. The method of claim 8, wherein sparsely sampling a plurality of smoothed orientation maps further includes
    sampling a third plurality of points on a third smoothed orientation map, the third plurality of points arranged in a third ring concentric with the location of the point, the third smoothed orientation map corresponding to a third scale space of lower resolution than the first scale space.

10. The method of claim 9, wherein the second ring has a second radius greater than a first radius for the first ring, and the third ring has a third radius greater than the second radius for the second ring.

11. The method of claim 1, wherein the plurality of orientation maps for each scale space include orientation maps for a plurality of different orientations.

12. The method of claim 1, further comprising:
    building a plurality of histograms of oriented gradients from the sparse sampling of the plurality of smoothed orientation maps, wherein the local feature descriptor comprises the plurality of histograms.

13. The method of claim 1, wherein said method includes, subsequent to said identifying and prior to said sparsely sampling, selecting a scale space to be among the two or more scale spaces, based on a smoothing coefficient of the scale space.

14. An image processing device, comprising:
    an input interface adapted to obtain an image;
    a storage device to store local feature descriptors for one or more images;
    a hardware processing circuit coupled to the input interface and the storage device, the hardware processing circuit adapted to:
        identify a point within a first scale space from a plurality of scale spaces for an image;
        obtain a plurality of image derivatives for each of the plurality of scale spaces;
        obtain a plurality of orientation maps for each scale space in the plurality of scale spaces, where each of the plurality of orientation maps is obtained from non-negative values of a corresponding image derivative;
        for each scale space in the plurality of scale spaces, smooth each of the plurality of orientation maps to obtain a corresponding plurality of smoothed orientation maps; and
        sparsely sample a plurality of smoothed orientation maps corresponding to two or more scale spaces from the plurality of scale spaces to generate a local feature descriptor for the point, wherein each of the smoothed orientation maps that is sparsely sampled is derived using a different orientation map than each of the other smoothed orientation maps that is sparsely sampled.

15. The device of claim 14, wherein the two or more scale spaces include the first scale space and one or more additional scale spaces of lower resolution than the first scale space.

16. The device of claim 14, wherein the processing circuit is further adapted to gradually smooth the image to obtain the plurality of scale spaces.

17. The device of claim 14, wherein the local feature descriptor has a kernel pooling configuration defined by spatial pooling of sample points distributed over a center on the point.

18. The device of claim 14, wherein sparsely sampling a plurality of smoothed orientation maps includes
sampling a first plurality of points on a first smoothed orientation map, the first plurality of points arranged in a first ring concentric with a location of the point; and
sampling a second plurality of points on a second smoothed orientation map, the second plurality of points arranged in a second ring concentric with the location of the point, the second smoothed orientation map corresponding to a second scale space of lower resolution than the first scale space.

19. The device of claim 14, wherein the processing circuit is further adapted to:
build a plurality of histograms of oriented gradients from the sparse sampling of the plurality of smoothed orientation maps, wherein the local feature descriptor comprises the plurality of histograms.

20. The device of claim 14, wherein said hardware processing circuit is adapted to select, subsequent to said identifying and prior to said sparsely sampling, a scale space to be among the two or more scale spaces, based on a smoothing coefficient of the scale space.

21. An image processing device, comprising:
means for identifying a point within a first scale space from a plurality of scale spaces for an image;
means for obtaining a plurality of image derivatives for each of the plurality of scale spaces;
means for obtaining a plurality of orientation maps for each scale space in the plurality of scale spaces, where each of the plurality of orientation maps is obtained from non-negative values of a corresponding image derivative;
means for smoothing, for each scale space in the plurality of scale spaces, each of the plurality of orientation maps to obtain a corresponding plurality of smoothed orientation maps; and
means for sparsely sampling a plurality of smoothed orientation maps corresponding to two or more scale spaces from the plurality of scale spaces to generate a local feature descriptor for the point,
wherein each of the smoothed orientation maps that is sparsely sampled is derived using a different orientation map than each of the other smoothed orientation maps that is sparsely sampled.

22. The device of claim 21, further comprising means for gradually smoothing the image to obtain the plurality of scale spaces.

23. The device of claim 21, wherein the two or more scale spaces include the first scale space and one or more additional scale spaces of lower resolution than the first scale space.

24. The device of claim 21, wherein the local feature descriptor has a kernel pooling configuration defined by spatial pooling of sample points distributed over a center on the point.

25. The device of claim 21, wherein means for sparsely sampling a plurality of smoothed orientation maps includes
means for sampling a first plurality of points on a first smoothed orientation map, the first plurality of points arranged in a first ring concentric with a location of the point; and
means for sampling a second plurality of points on a second smoothed orientation map, the second plurality of points arranged in a second ring concentric with the location of the point, the second smoothed orientation map corresponding to a second scale space of lower resolution than the first scale space.

26. The device of claim 21, further comprising:
means for building a plurality of histograms of oriented gradients from the sparse sampling of the plurality of smoothed orientation maps, wherein the local feature descriptor comprises the plurality of histograms.

27. A non-transitory processor-readable medium comprising one or more instructions operational in a device, which when executed by a processing circuit, causes the processing circuit to:
identify a point within a first scale space from a plurality of scale spaces for an image;
obtain a plurality of image derivatives for each of the plurality of scale spaces;
obtain a plurality of orientation maps for each scale space in the plurality of scale spaces, where each of the plurality of orientation maps is obtained from non-negative values of a corresponding image derivative;
for each scale space in the plurality of scale spaces, smooth each of the plurality of orientation maps to obtain a corresponding plurality of smoothed orientation maps; and
sparsely sample a plurality of smoothed orientation maps corresponding to two or more scale spaces from the plurality of scale spaces to generate a local feature descriptor for the point,
wherein each of the smoothed orientation maps that is sparsely sampled is derived using a different orientation map than each of the other smoothed orientation maps that is sparsely sampled.

28. The non-transitory processor-readable medium of claim 27, wherein the two or more scale spaces include the first scale space and one or more additional scale spaces of lower resolution than the first scale space.

29. The method of claim 1, wherein each orientation map in the plurality of orientation maps has only one corresponding smoothed orientation map in the plurality of smoothed orientation maps.

30. The method of claim 1, wherein said sparsely sampling comprises:
sparsely sampling a smoothed orientation map that is derived from the first scale space; and
sparsely sampling a smoothed orientation map that is derived from a scale space in the plurality of scale spaces that is different than the first scale space.

31. The non-transitory processor-readable medium of claim 27, wherein said one or more instructions, when executed by the processing circuit, further causes the processing circuit to gradually smooth the image to obtain the plurality of scale spaces.

32. The device of claim 14, wherein said smoothing comprises:

smoothing each of the plurality of orientation maps for the first scale space by a first smoothing coefficient to generate the corresponding plurality of smoothed orientation maps; and smoothing each of the plurality of orientation maps for a second scale space in the plurality of scale spaces by the first smoothing coefficient to generate the corresponding plurality of smoothed orientation maps, wherein the second scale space is different than the first scale space.

33. The device of claim 14, wherein said sparsely sampling comprises:

sparsely sampling a smoothed orientation map that is derived from the first scale space; and sparsely sampling a smoothed orientation map that is derived from a scale space in the plurality of scale spaces that is different than the first scale space.

34. The device of claim 21, wherein said smoothing comprises:

smoothing each of the plurality of orientation maps for the first scale space by a first smoothing coefficient to generate the corresponding plurality of smoothed orientation maps; and smoothing each of the plurality of orientation maps for a second scale space in the plurality of scale spaces by the first smoothing coefficient to generate the corresponding plurality of smoothed orientation maps, wherein the second scale space is different than the first scale space.

35. The device of claim 21, wherein said device includes means for selecting, subsequent to said identifying and prior to said sparsely sampling, a scale space to be among the two or more scale spaces, based on a smoothing coefficient of the scale space.

36. The device of claim 21, wherein said sparsely sampling comprises:

sparsely sampling a smoothed orientation map that is derived from the first scale space; and sparsely sampling a smoothed orientation map that is derived from a scale space in the plurality of scale spaces that is different than the first scale space.

37. The non-transitory processor-readable medium of claim 27, wherein said smoothing comprises:

smoothing each of the plurality of orientation maps for the first scale space by a first smoothing coefficient to generate the corresponding plurality of smoothed orientation maps; and smoothing each of the plurality of orientation maps for a second scale space in the plurality of scale spaces by the first smoothing coefficient to generate the corresponding plurality of smoothed orientation maps, wherein the second scale space is different than the first scale space.

* * * * *